United States Patent
Chang et al.

(10) Patent No.: US 6,291,146 B1
(45) Date of Patent: Sep. 18, 2001

(54) METHOD FOR REFORMING A REFLECTION-TYPE LIGHT DIFFUSER

(75) Inventors: Wei-Chih Chang, Miao Li Hsien; Dai-Liang Ting, Hsinchu; Chung-Yuan Liu, Taipei; Jyh-Wen Shiu, Hsinchu Hsien, all of (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/288,963

(22) Filed: Apr. 9, 1999

(51) Int. Cl.[7] .............................. G03C 5/00; G02F 1/1335
(52) U.S. Cl. ............................... 430/394; 349/64; 349/113
(58) Field of Search ............................... 430/394; 349/64, 349/113

(56) References Cited

U.S. PATENT DOCUMENTS 5,365,354 * 11/1994 Jannson et al. ......................... 359/15
5,610,741   3/1997 Kimura ................................. 349/113
5,945,967 * 8/1999 Rallison et al. ......................... 345/32

* cited by examiner

*Primary Examiner*—Shean C. Wu
(74) *Attorney, Agent, or Firm*—McDermott, Will & Emery

(57) ABSTRACT

The invention provides a method for fabricating reflection-type light diffuser which is a substrate having a plurality of bumpy elements with reflective curved surfaces. Each of the plurality of bumpy elements having a first surface and a second surface, the first angle ($\alpha$ or $\theta$) between the first surface and the substrate is different from the second angle ($\beta$ or $\phi$) between the second surface and the substrate. A Multi-Exposure Shift Method along with specially designed masks are proposed for manufacturing the curved reflective elements in the present invention. The invention can also be used in a traditional TFT-LCD, with the diffusive film layer eliminated, as an element between the liquid crystal layer and the active matrix.

14 Claims, 23 Drawing Sheets

METHOD FOR REFORMING A REFLECTION-TYPE LIGHT DIFFUSER

BACKGROUND OF THE INVENTION

1. Field of the Invention

The instant invention relates to an apparatus for diffusing reflected light, such as that from a reflective TFT-LCD (Thin Film Transistor-Liquid crystal display), into a desired solid angle which can be deviated from the unpleasant high intensity specular ray usually produced by the covering glass.

2. Description of the Related Art

To facilitate later discussion, we first define the optics terms and variables that shall be used, as shown in FIG. 1. An incident plane is the plane containing the incident ray and the normal direction of the reflection point. A specular ray is defined as the reflected light ray on the incident plane whose reflected angle is equal to the incident angle. The light cone subtended by the diffused light is called a diffused light cone. Define the distribution angle of the diffused light cone in the incident plane as the vertical diffusion angle, $\theta_S$, and that perpendicular to the incident plane as the horizontal diffusion angle, $\theta_T$. A deviation angle $\theta_0$ is the angle between the specular ray and the central ray in the diffused light cone.

Traditional reflective light diffusing elements, such as diffusive films (e.g., the Poloroid Holographic Reflector and Sumitomo Lumisty) or bump reflectors (e.g., U.S. Pat. No. 5,610,741 and R.O.C. Patent No. 255,019), can not simultaneously achieve the goals of controlling the size of the diffused light cone, directing the reflected light distribution away from the specular ray, keeping the resolution power, and preventing from color dispersion. However, for certain applications the specular ray reflected by the covering glass is undesired because it is glare of the virtual image of the light source, and also, owing to the user's viewing angle, one side of the usual diffused light cone around the specular ray will be useless. Since the efficiency of usual reflective TFT-LCDs is already as low as 10%, extra waste of diffused light will demand a stronger light source and thus cause further increase in the cost. Therefore, effectively controlling and smoothly distributing diffused light within specific solid angle to yield higher intensity and more thorough use of reflected light from a reflective liquid crystal display (LCD) will be of great practical value.

One way to improve the above situation is by combining a diffusive film with a slant reflector structure. Although a diffused reflective light away from the specular ray can be achieved in this way, yet this method obviously increases the structure cost and, as a drawback of usual diffusive films, decreases the resolution of the LCD and causes the color dispersion problem.

SUMMARY OF THE INVENTION

An object of the invention is to provide a reflection-type light diffuser which can reflect and diffuse incident light to a desired solid angle with required intensity uniformity and has no degradation of display quality.

The invention provides a reflection-type light diffuser for scattering incident light into a desired angular area away from the specular ray, said reflector comprises:

a substrate;

a plurality of bumpy elements connected onto said substrate according to a pattern to form a nonplanar surface; and a layer of reflective material uniformly coating onto said plurality of bumpy elements and uncovered said substrate, whereby a nonplanar reflecting surface is formed for reflecting and diffusing incident light from above;

wherein each of said plurality of bumpy elements has a first surface and a second surface, with said first surface having a longer slant than said second surface and the normal direction of said first surface being pointing to a predetermined direction.

As described above, according to the invention each of the first longer surfaces has a monotonically convex and/or concave curve in the incident plane for scattering incident light into a desired angular area in the incident plane with specific intensity uniformity.

Further, as described above, according to the invention each of the first longer slants has an irregular curve in the incident plane. Although the curve is irregular, the incident light will still be scattered into a certain angular area in the incident plane, yet the intensity uniformity is not guaranteed because of the irregular surface.

Yet further, according to the invention, each of the first longer slants has a wavy curve in the horizontal plane for scattering light into a desired solid angle with specific intensity uniformity.

Further according to the invention, each of the first longer slants has an irregular curve in the horizontal plane. Again, in spite of the irregularity, the incident light will be scattered into a certain solid angle without the guarantee of intensity uniformity.

Further, the invention provides a mask for the photo-exposure procedures for making a reflection-type light diffuser according to the instant invention, wherein said mask comprises an opaque plate with a plurality of parallel straight slits with each of said slits further comprises bumpy punctures and/or dented patches along one side of it.

Yet further, the invention provides a mask for the photo-exposure procedures for making a reflection-type light diffuser according to the instant invention, wherein said mask comprises an opaque plate with a plurality of regular wavy slits with fixed separation or irregular wavy slits with fixed separation.

DETAILED DESCRIPTION OF THE INVENTION

Table 1 is a benefit comparison list of diffusers currently available in the industry along with the present invention, in which the structure of the present invention is of diffusive slant according to the present invention.

TABLE 1

| PRODUCT NAME | CONTROLLING $\theta_T$ | CONTROLLING $\theta_O$ | CONTROLLING $\theta_T/\theta_S$ | RESOLUTION | COLOR DISPERSION | REMARK |
| --- | --- | --- | --- | --- | --- | --- |
| 3M Diffuser Film | Yes | No | No | Lowered | No | |
| Sumitomo Lumisty | Yes | Yes | Yes | Lowered | Little | Incident Angle Selection |

TABLE 1-continued

| PRODUCT NAME | CONTROLLING $\theta_T$ | CONTROLLING $\theta_0$ | CONTROLLING $\theta_T/\theta_S$ | RESOLUTION | COLOR DISPERSION | REMARK |
| --- | --- | --- | --- | --- | --- | --- |
| Poloroid Holographic Reflector | Yes | Yes | Yes | Lowered | Serious | Incident Angle Selection |
| Sharp Internal Bump | Yes | No | No | Same | No | |
| Diffusive Slant (present invention) | Yes | Yes | Yes | Same | No | |

To make the most of reflected light, it is highly desirable if one is able to adjust the direction of diffused light to the usual viewing angle while still keeping the resolution and avoiding color dispersion.

In observation of these disadvantages and needs, the present invention proposes a new method that improves the previous ERSO (Electronic Research & Service Organization) slant reflector patent in such a manner that the reflective elements can also diffuse reflected light to predetermined solid angle. First, a specially designed mask is utilized in the multi-exposure process for the photoresist on a substrate. The slit curves on the mask are carefully arranged and the exposure time is fine-tuned so that, after developing and possibly a proper baking procedure, a specific pattern of curved surface is formed on the substrate. Then apply a uniform layer of reflective material on thus produced surface. Because of the nonvanishing curvature of those bumpy surfaces, an incident light will be reflected toward a different direction from the specular ray; and by changing the curvatures in different tangent directions of the surface, one can readily adjust the solid angle subtended by the thus diffused light to the required one.

Since no particular diffusive film is used in the present invention, the structural cost is thus lowered. Not only is the resolution retained, but also the reflected light intensity will not be decreased. Furthermore, color dispersion is not an issue to worry in this case. And one may choose a proper mask and follow the correct steps to make a reflective diffuser suitable for his uses.

Figure 2:
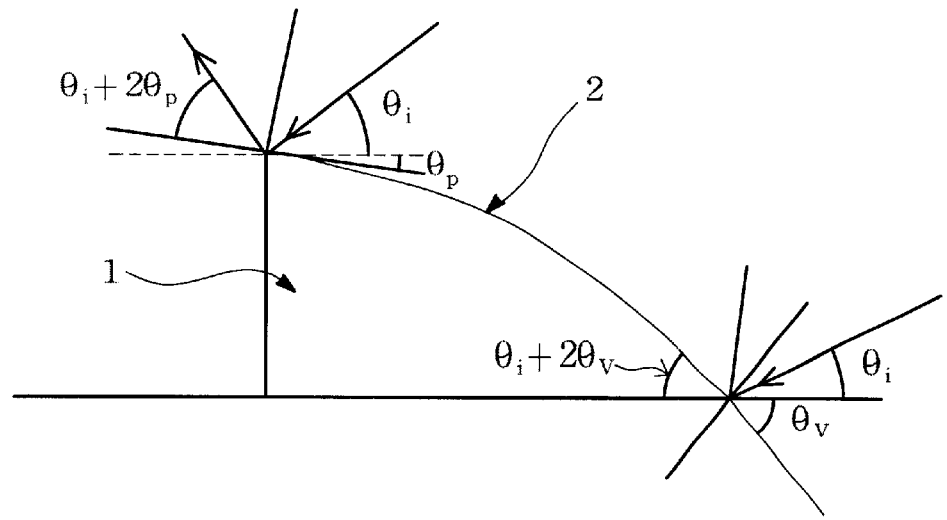
FIG. 2 is a microscopic view of the cross section of one reflective element of a curve slant reflector according to the present invention in the incident plane.
Figure 3:
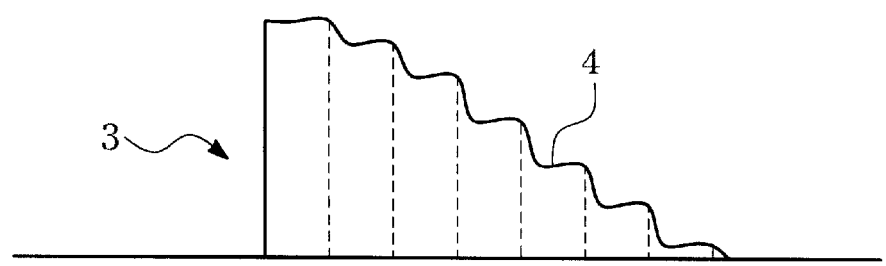
FIG. 3 is a microscopic view of the cross section of one reflective element of an irregular slant reflector according to the present invention in the incident plane.

FIGS. 2 and 3 are two microscopic views of individual reflective element cross sections in the vertical plane, illustrating two ways to achieve the goal of diffusing reflective light in the incident plane. In one preferred embodiment, the whole reflector is composed of a set of such reflective elements aligned parallel to one another.

As shown in FIG. 2, the slant of the reflecting surface 2 of the curve slant reflective element 1 is a monotonically convex curve. No two points on the slant have the same slope. The steepest and smallest slopes occur at the bottom and the top of the slant, respectively. Define the angle between the substrate and the tangent of the smallest slope, in this case at the top of the slant, as $\theta_P$ and that between the substrate and the tangent of the largest slope, in this case at the bottom of the slant, as $\theta_V$. Then, according to the principles of optics, reflected light will be deviated from the specular ray by $2\theta_P$ to $2\theta_V$. Thus, with this kind of reflector, incident light will be reflected and diffused into an angular area $2\theta_V$–$2\theta_P$ deviated away from the specular ray by $2\theta_P$. One can then adjust these two angles along with the convexity, or equivalently the curvature, of the slant to control the directions of the diffused light to meet practical needs.

If properly shaped, i.e., with the correct $\theta_V$, $\theta_P$ and concavity, even a slant reflector with a monotonically concave slant will achieve the same effect. However, in this case, $\theta_V$ appears at the top of the slant while $\theta_P$ appears at the bottom. Practically, this kind of structure is harder to obtain though, since it demands a sharp edge at the top of the slant.

FIG. 3 illustrates an irregular slant reflective element 3. The character of this kind of structure is that the extrema of the slant slope of the reflecting surface 4 do not necessarily appear at the top and bottom of the slant and two points on the slant may have the same slope. Owing to the nature of the irregular structure, incident light rays will be randomly reflected into different directions, but still fall within the angular area $2\theta_P$–$2\theta_V$ controlled by the largest and smallest slopes. The flux intensity of reflected light may not be uniform in all directions.

Figure 1:
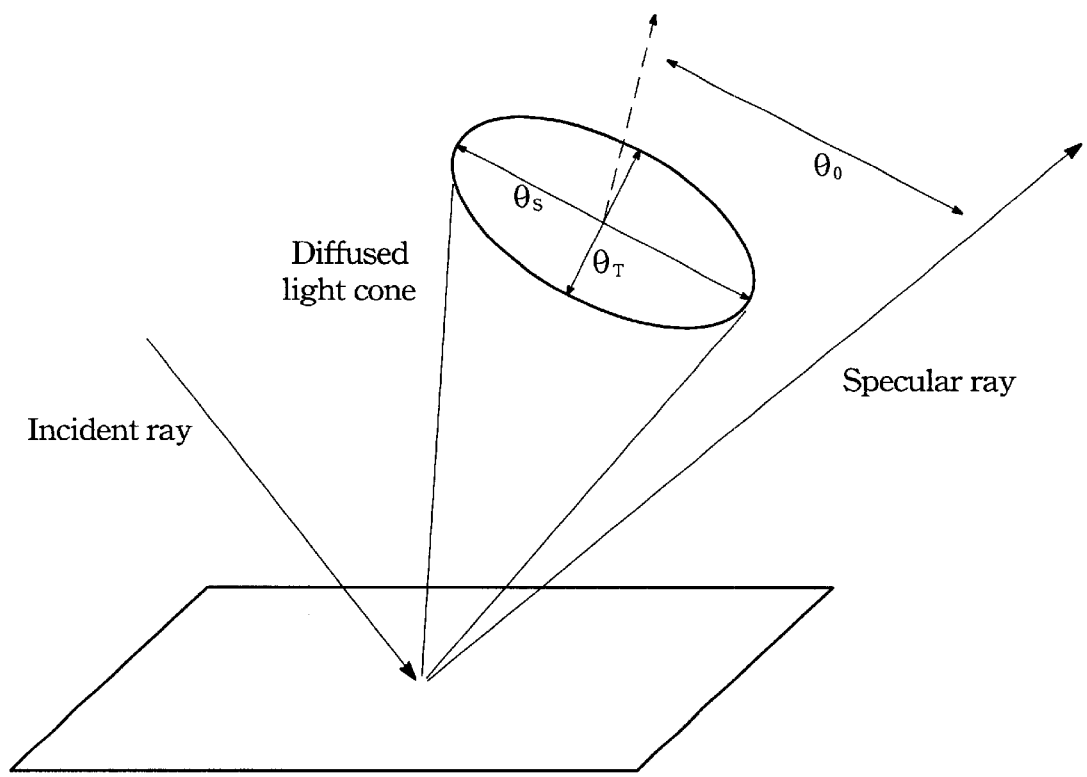
FIG. 1 is a diagram illustrating relevant optics terms and variables used in the specification.
Figure 4:
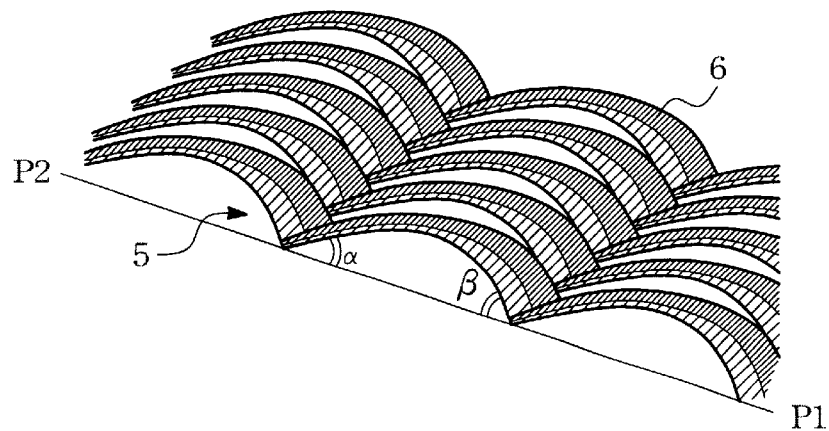
FIG. 4 is a three dimensional perspective of the structure of a curve surface reflector according to the present invention.
Figure 5:
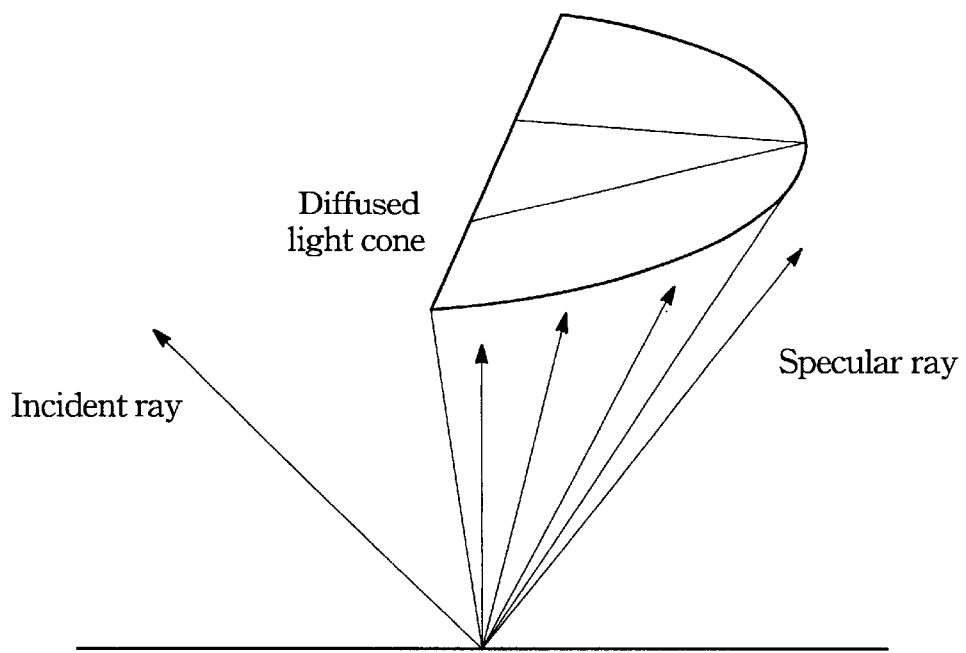
FIG. 5 is a schematic diagram showing the reflection and diffusion of an incident light ray by a curve surface reflector according to the present invention.

A preferred embodiment of the present invention is a curve surface reflector 5, as illustrated by the three dimensional perspective of its structure in FIG. 4. It has the feature that the reflecting surface 6 does not only curve in the slant direction, as in the case of a curve slant reflector, but also curve in the horizontal direction perpendicular to the slant direction. By the same reflecting principle, the incident light rays will be reflected by the curve surface reflector 5 and be scattered into a solid angle, as shown in FIG. 5. The vertical diffusion angle, $\theta_S$, (shown in FIG. 1) the horizontal diffusion angle, $\theta_T$ (shown in FIG. 1), and the deviation angle $\theta_0$ (shown in FIG. 1) are controlled by how the reflecting surface is curved and what the extremal slopes in different directions are.

Figure 6A:
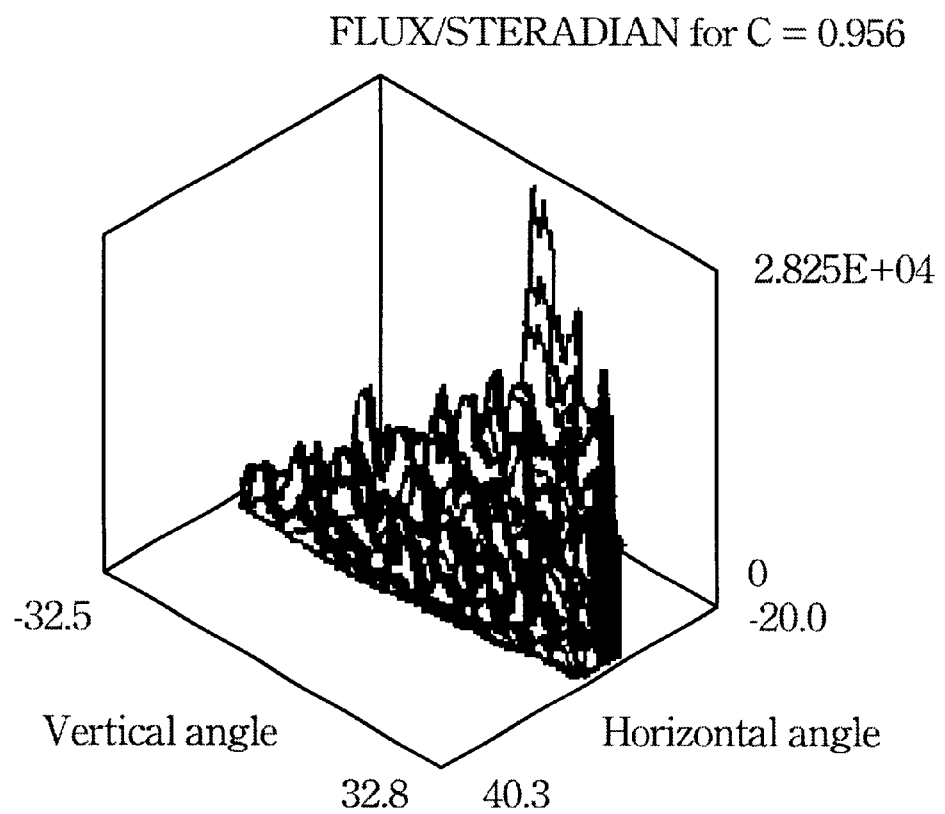
FIG. 6(a) is an experimental result of light intensity distribution diffused by a curve surface reflector according to the present invention.
Figure 6B:
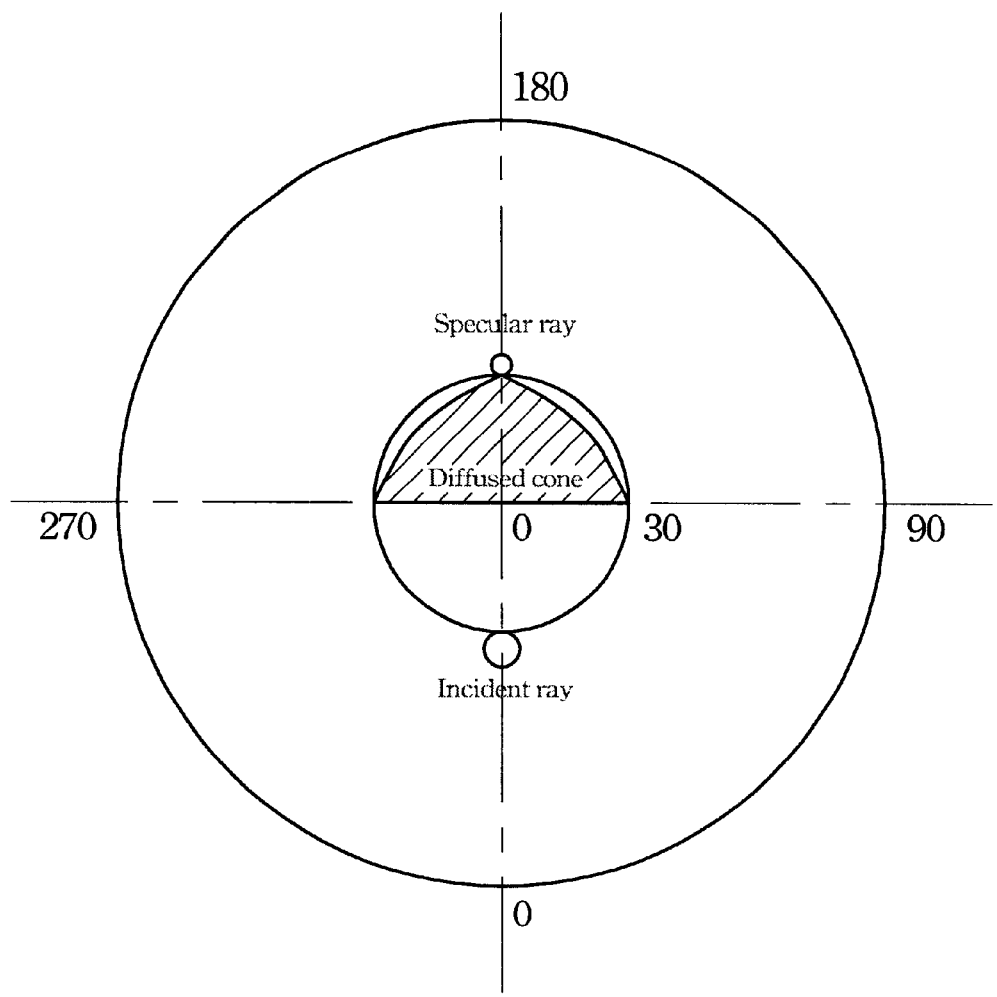
FIG. 6(b) is a schematic diagram showing the ideal viewing angular area.

FIG. 6(a) gives the diffused light flux versus the vertical and horizontal diffusion angles as an experimental result of the curve surface reflector 5. FIG. 6(b) delineates a schematic diagram of ideal diffusive light distribution; wherein the lower circle indicates a typical light incident angle, the upper circle indicates the corresponding specular angle, and the shaded triangular area is an solid angular area ideal for user's viewing which is the objective of and achieved by the present invention, as illustrated in the wedge shape flux distribution in FIG. 6(a).

Figure 7A:
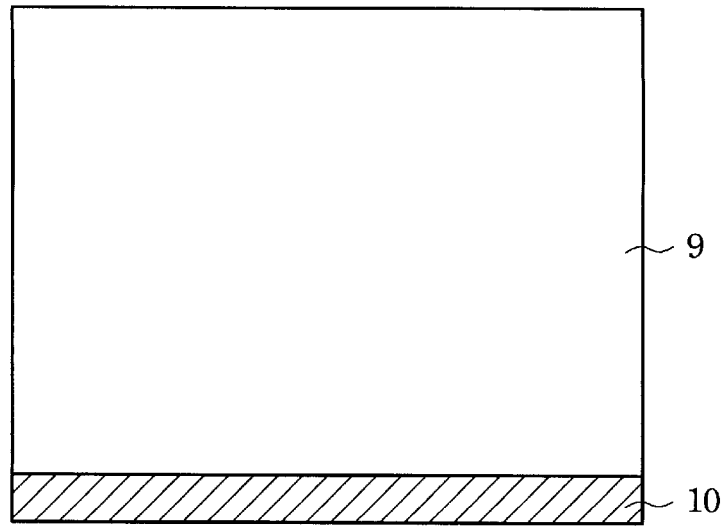
FIG. 7(a) is the cross section of the substrate with a photoresist layer formed on the substrate according to one preferred embodiment of the present invention.
Figure 7B:
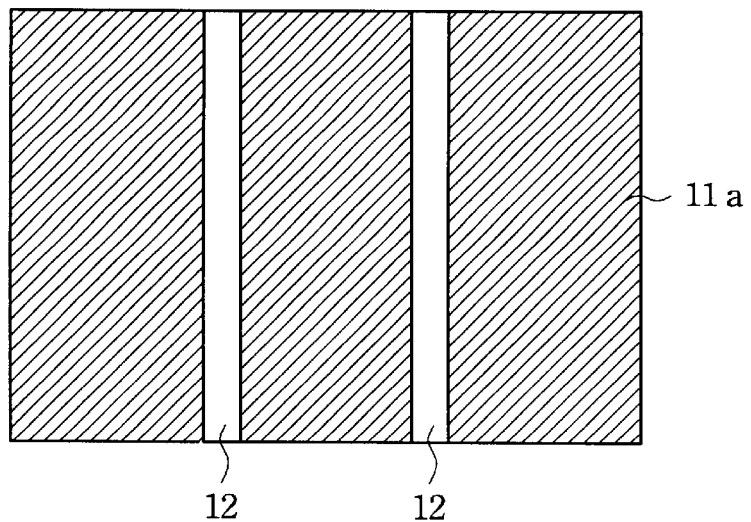
FIG. 7(b) is the top view of a first mask utilized in a multi-exposure shift method for fabricating reflection-type light diffuser (reflector) according to one preferred embodiment of the present invention.
Figure 7C:
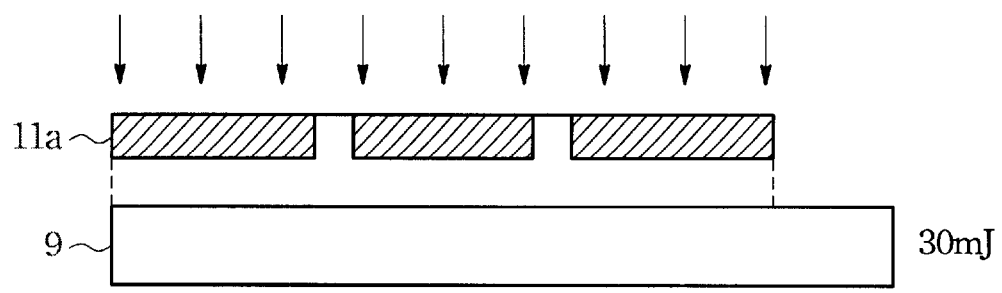
FIGS. 7(c)–7(e) are a series of sectional views illustrating the position of the mask relative to the photoresist layer and the steps of a multi-exposure shift method for making a reflector on a substrate according to one preferred embodiment of the present invention.
Figure 7D:
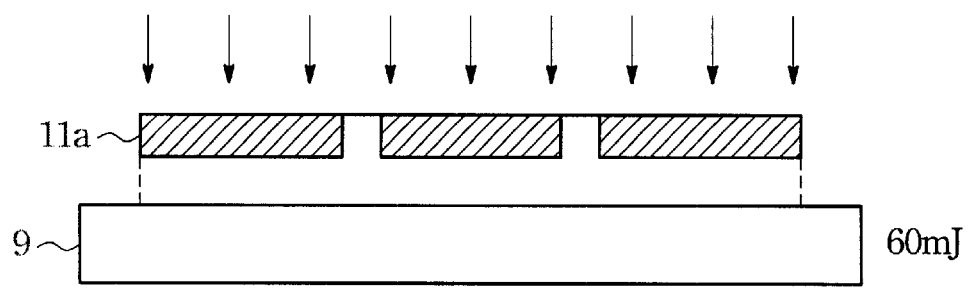
Figure 7E:
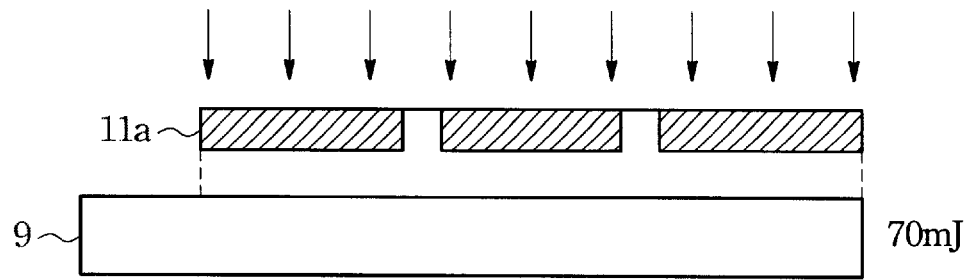
Figure 8A:
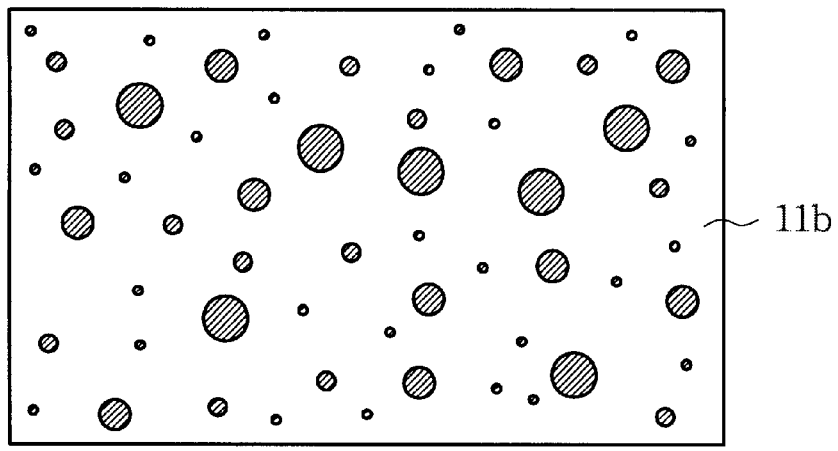
FIG. 8(a) is the top view of one type of the second mask utilized for fabricating knob portion of the reflection-type light diffuser (reflector) according to one preferred embodiment of the present invention.
Figure 8B:
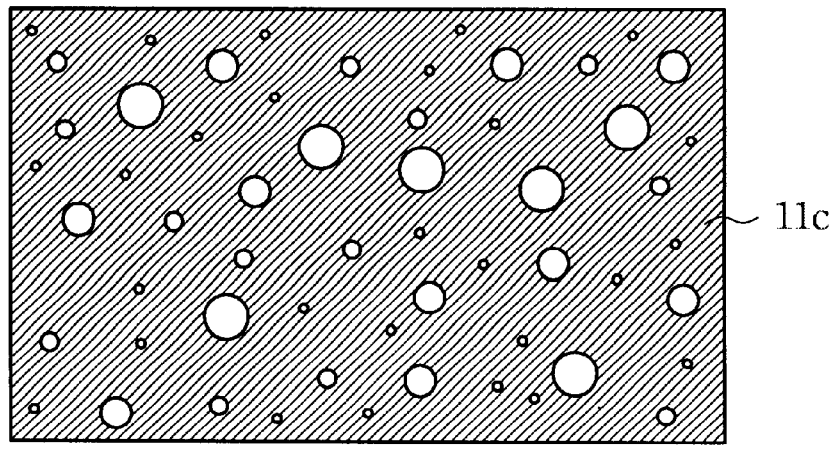
FIG. 8(b) is the top view of the other type of the second mask utilized for fabricating knob portion of the reflection-type light diffuser (reflector) according to one preferred embodiment of the present invention.
Figure 9A:
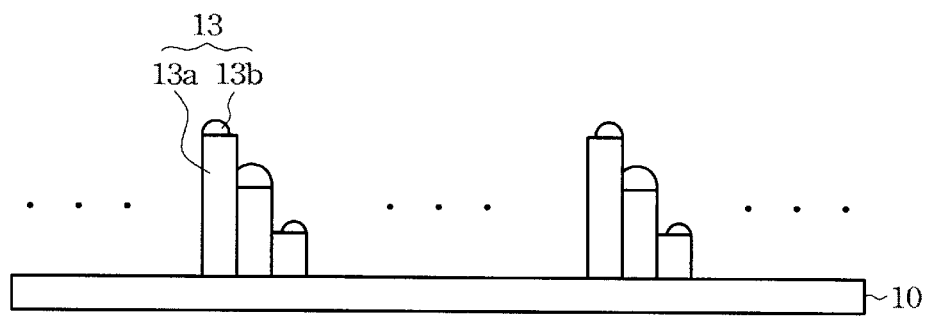
FIG. 9(a) illustrate the cross sectional view of the knob-on-slant structure resulted from the multi-exposure shift method using mask shown in FIG. 7(b) and the exposure process using the mask shown in FIG. 8(a) according to one preferred embodiment of the present invention.
Figure 9B:
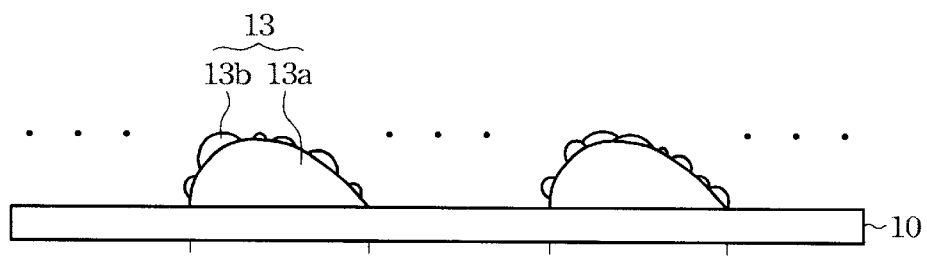
FIG. 9(b) illustrate the sectional view of the knob-on-slant structure shown in FIG. 9(a) after processed by a baking process according to one preferred embodiment of the present invention.
Figure 9C:
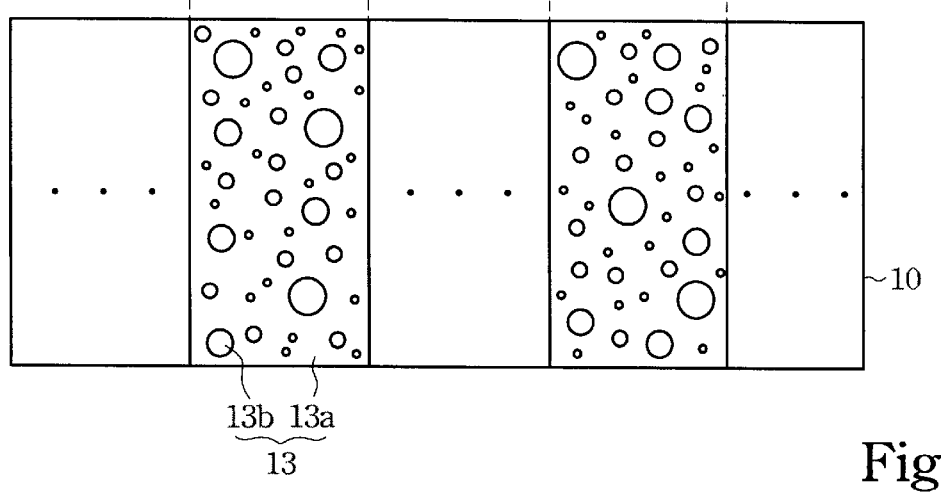
FIG. 9(c) illustrate the top view of the knob-on-slant structure shown in FIG. 9(b).

In order to confine the reflected light to the expected solid angular area shown in FIGS. 6a and 6b, the present invention propose several embodiments for fabricating the curve surface reflectors according to the present invention. The present invention uses the Multi-Exposure Shift Method to manufacture the desired reflector. First create a layer of positive photoresist layer 9 with predetermined thickness on a substrate 10, as shown in FIG. 7(a). Then according to the structure of the desired reflector in the preferred embodiment of the present invention, prepare a mask 11a, as shown in FIG. 7(b), with a set of parallel slits 12 of proper width and with predetermined separation. Expose the photoresist layer 9 to the light source with the coverage of mask 11a for predetermined time pursuant to one's need, then shift the mask 11a by one pitch, which is about the slit width, and expose again, as shown in FIGS. 7(c), (d), and (e). In FIG. 7(c), the photoresist layer 9 is exposed to the light having a power of 30 mJoul for a first predetermined period, then forward the mask 11a for a pitch. Referring to FIG. 7(d), the photoresist layer 9 is again exposed to the light having a power of 60 mJoul for a second predetermined period, subsequently forward the mask 11a for a pitch. As shown in FIG. 7(e), the photoresist layer 9 is exposed to the light having a power of 70 mJoul for a first predetermined period. Repeat such procedure several times as one needs followed by exposing the photoresist layer 9 to the light source shown in FIG. 7(c) for a fourth period of time, then putting the plate under development. Because the photoresist layer 9 in the preferred embodiment of the present invention can be made of positive photoresist. When the mask 11b is used in the exposure process, the areas on the photoresist layer 9 shadowed by the areas full of oblique lines shown in FIG. 8(a) will become convex portions after development. Similarly, when the mask 11c is used in the exposure process, the areas on the photoresist layer 9 without the shading of the oblique-line area shown in FIG. 8(b) will become concave portions after development. One preferred embodiment of the present invention utilizes the exposure procedure of photoresist layer 9 using mask 11b to illustrate how the reflector of LCD according to the present invention is fabricated. The cross-section of the photoresist layer 9 after development is shown in FIG. 9(a), in which the slant portion 13a is formed by using mask 11a (shown in FIG. 7(c)), and the knob portion 13b is formed by using mask 11b (shown in FIG. 8(a)). The photoresist pattern acquired after development process includes a plurality of knob-on-slant structure 13 parallel each other which is shown in FIG. 9(a), in which the knob-on-slant structure 13 includes the slant portion 13a and the knob portion 13b. Then bake the developed photoresist layer 9, the baked knob-on-slant structure 13 is shown in FIG. 9(b). The top view of FIG. 9(b) is shown in FIG. 9(c), in which the knob-on-slant structure 13 can be in connection one by one, or can be separate one by one.

Figure 9D:
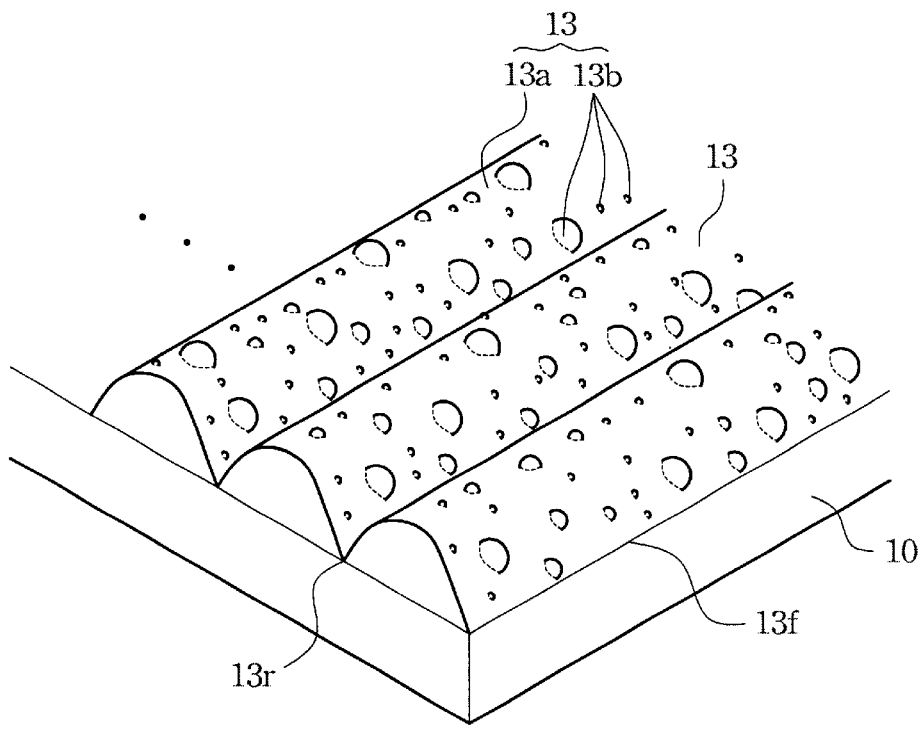
FIG. 9(d) illustrate the oblique drawing of the knob-on-slant structure shown in FIG. 9(b).
Figure 9E:
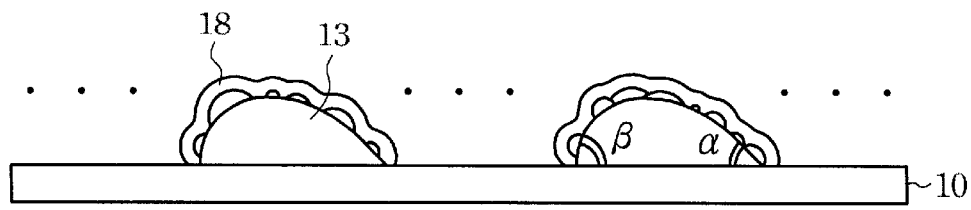
FIG. 9(e) illustrate the sectional view of the knob-on-slant structure shown in FIG. 9(b) after the formation of reflective layer on the baked photoresist pattern.

In the preferred embodiment of the present invention, the photoresist pattern is illustrated as been composed of a plurality of knob-on-slant structure 13 connected one by one. The oblique drawing of the developed photoresist layer 9 is shown in FIG. 9(d), in which the developed photoresist layer 9 includes a plurality of knob-on-slant structure 13 parallel and connected one by one. As shown in FIG. 9(d), the knob-on-slant structure 13 is formed on the substrate 10, and the slant portion 13a is on the substrate 10, the knob portion 13b is on the slant portion 13a. The cross-section of FIG. 9(d) is used as an example illustrating the following process that making a reflector. After the baking process, a reflecting material 18 is formed on the knob-on-slant structure 13, and the cross-section is illustrated in FIG. 9(e).

The curvature in cross-section of the slant is controlled by each exposure time. Therefore, with the same slit mask 11a but different exposure schemes, one can obtain either a convex curve slant reflector, a concave curve slant reflector, or an irregular slant reflector. Namely, the exposure time H is a function of the photoresist's thickness T, and T, in turn, is a function of the position x of the photoresist on the substrate 10. So in order to obtain a slant of a curve T(x), the correct exposure time at each point is H(T(x)).

It is noted that although the front edge 13f and the rear edge 13r of the knob-on-slant structure 13 shown in FIG. 9(d) are parallel straight lines, it is only one structure of the preferred embodiment that using the mask 11a shown in FIG. 7(b). Because the parallel slits 12 are straight, the front edge 13f and the rear edge 13r of the knob-on-slant structure 13 are both parallel straight lines.

Figure 10:
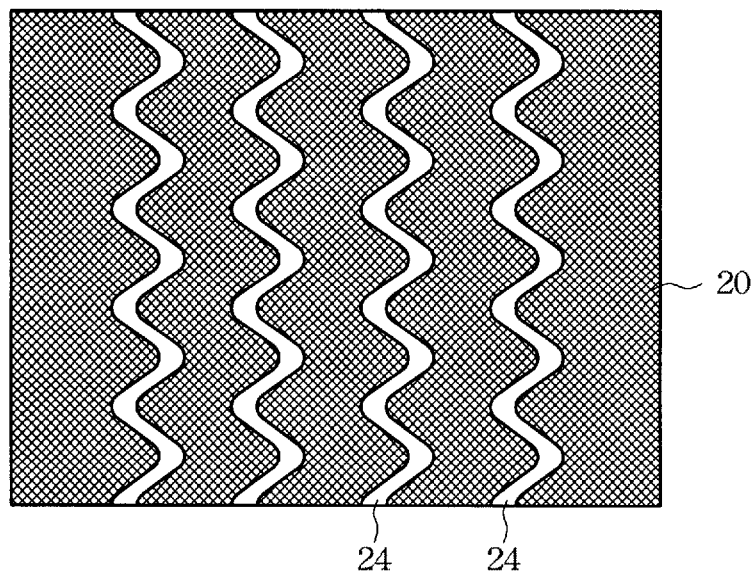
FIG. 10 is the top view of the first mask utilized for fabricating slant portion of the reflection-type light diffuser (reflector) according to the other preferred embodiment of the present invention.

FIG. 10 is the top view of the first mask utilized for fabricating the slant portion of the reflection-type light diffuse (reflector) according to the other preferred embodiment of the present invention.

Figure 11A:
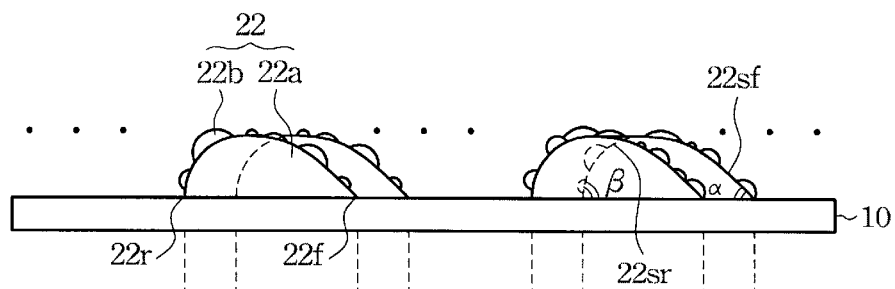
FIG. 11(a) illustrate the cross oblique drawing of the knob-on-slant structure with curved edge according to the other preferred embodiment of the present invention.
Figure 11B:
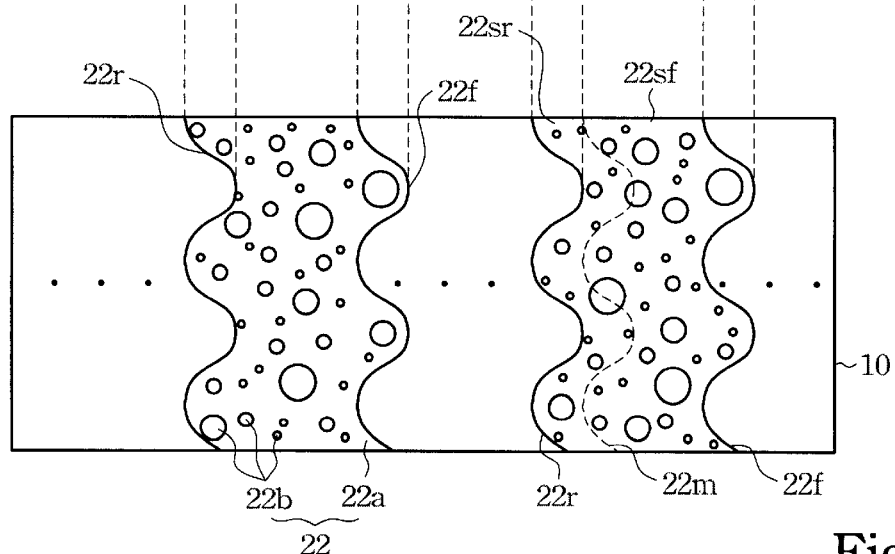
FIG. 11(b) illustrate the top view of the knob-on-slant structure with curved edge according to the other preferred embodiment of the present invention.
Figure 11C:
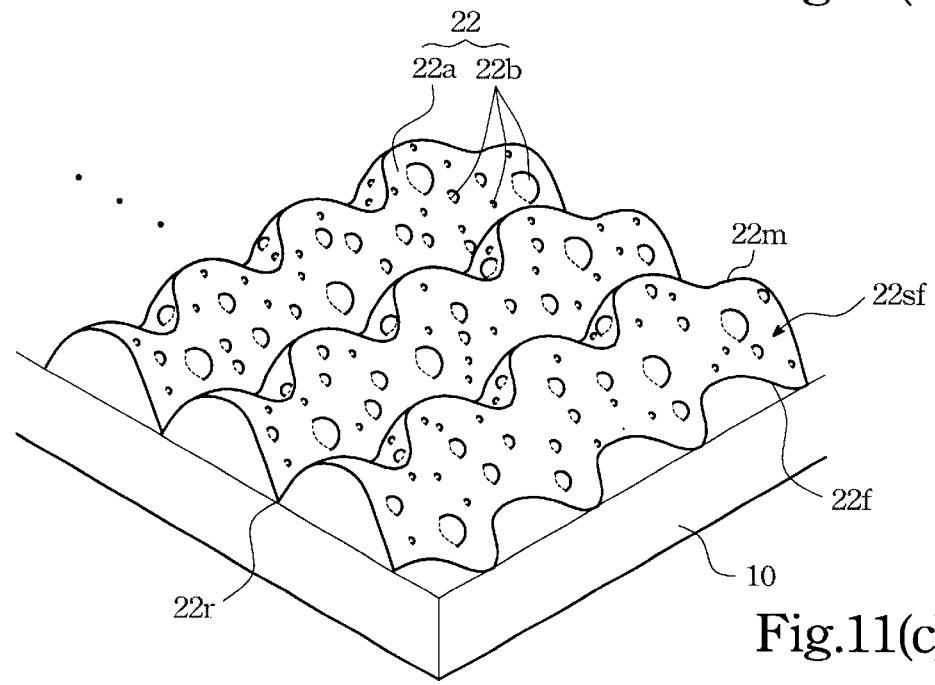
FIG. 11(c) illustrate the oblique drawing of the knob-on-slant structure according to the other preferred embodiment of the present invention shown in FIG. 11(b).

In the other preferred embodiment of the present invention, the mask 20 shown in FIG. 10 can be used in the subsequent exposure processes shown in FIG. 7(c) to FIG. 7(e). Then use the mask 11b shown in FIG. 8(a) or the mask 11c shown in FIG. 8(b) as a mask to expose the photoresist layer 9 to obtain the bump-on-slant structure of curve front edge and rear edge. The cross-section of the structure fabricated by the method proposed by the other preferred embodiment of the present invention is shown in FIG. 11(a). The curved bump-on-slant structure 22 shown in FIG. 11(a) includes the slant portion 22a and the knob portion 22b. The slant portion 22a is on the substrate 10, and the knob portion 22b is on the slant portion 22a. Because the transparent portion of the mask 20 is parallel slits 24 which are curve, the front edge 22f and the rear edge 22r of the curved knob-on-slant structure 22 are parallel curves front edge 22f and the rear edge 22r respectively. In addition, the first surface 22sf of the slant portion 22a interlaces with the substrate 10 by the front edge 22f, and the second surface 22sr of the slant portion 22a interlaces with the substrate 10 by the front edge 22r. Particularly, as shown in FIG. 11(b), the interface of the first surface 22sf and the second surface 22sr is the protrusive peak edge 22m, which is at the top of the slant portion 22a. As illustrated in FIG. 11(b), the angle between the first surface 22sf and the second surface 22sr are angle α and β respectively. According to the present invention, the angles α and β are not the same in magnitude. In the preferred embodiment of the present invention mentioned prior to the other preferred embodiment, the relation between the angles α and β shown in FIG. 9(e) is the same as that shown in FIG. 11(a). The oblique drawing of the curved bump-on-slant structure 22 according to the other preferred embodiment of the present invention is shown in FIG. 11(c). After the curved bump-on-slant structure 22 has been fabricated, a reflective material is formed on the curved bump-on-slant structure 22.

Figure 12:
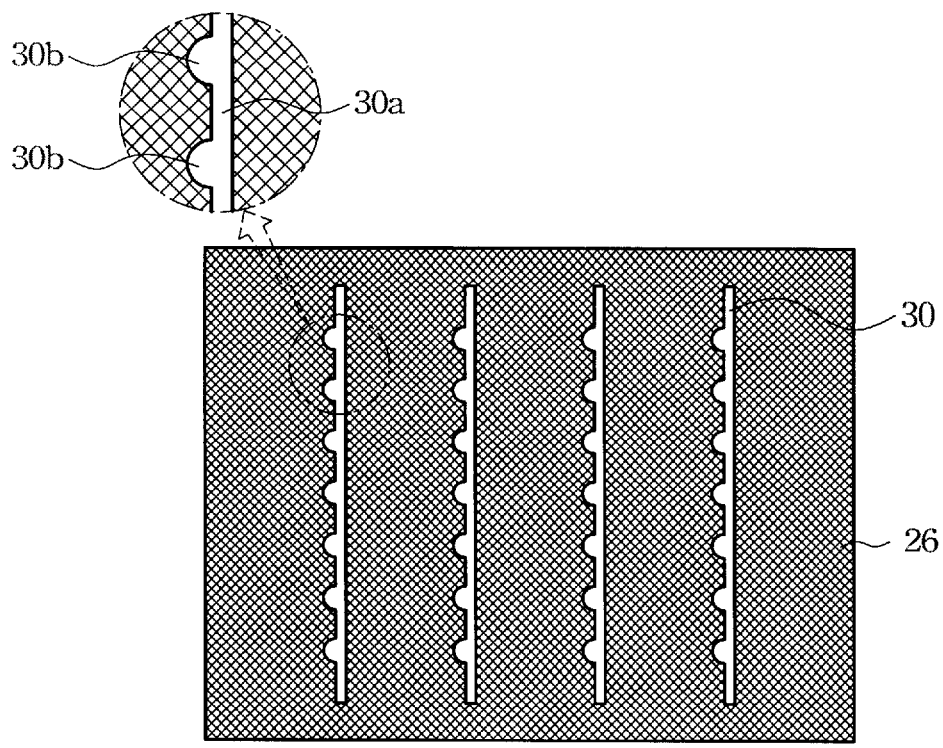
FIG. 12 illustrate the top view of the mask utilized in fabricating the reflector according to another preferred embodiment of the present invention.
Figure 13A:
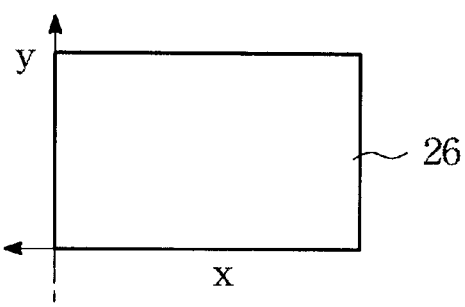
FIGS. 13(a)–(c) illustrate the top views showing the movement of the mask utilized another preferred embodiment of the present invention.
Figure 13B:
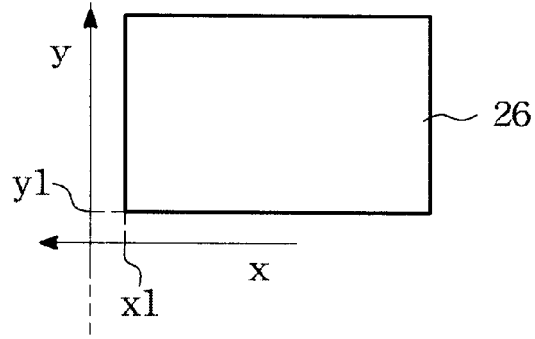
Figure 13C:
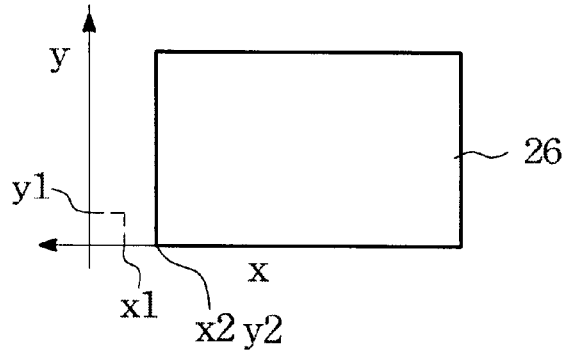
Figure 14A:
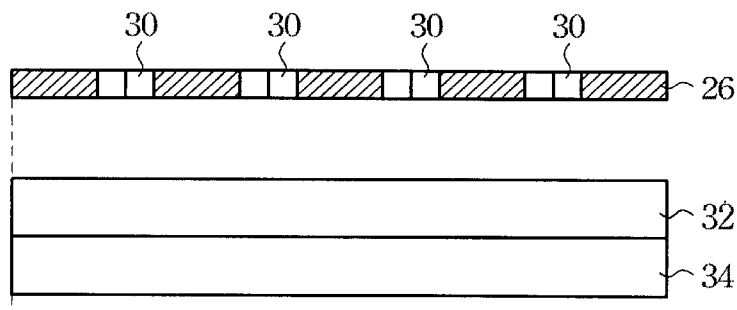
FIGS. 14(a)–14(c) illustrate a series of sectional views illustrating the position of the mask relative to the photoresist layer and the steps of the multi-exposure shift method used in another preferred embodiment of the present invention.
Figure 14B:
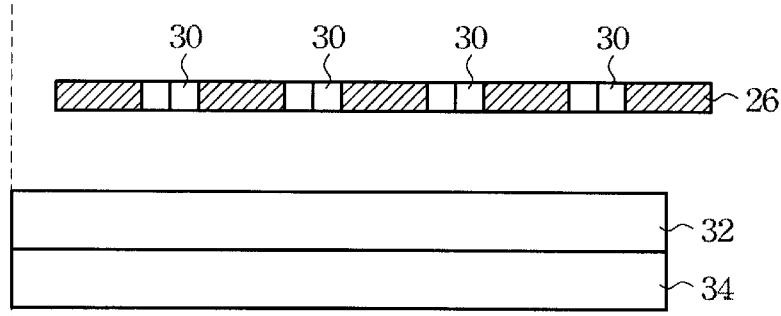
Figure 14C:
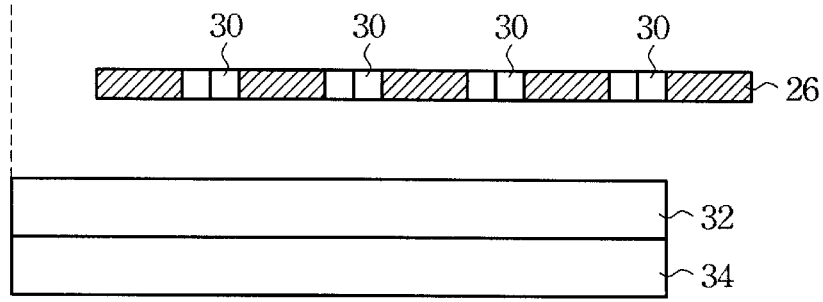

Another method proposed by another preferred embodiment of the present invention can be used to form the bump-on-slant structure of various type when compared with that of the forgoing two preferred embodiments of the present invention. In another preferred embodiment of the present invention, referring to FIG. 12, the mask 26 (including a set of transparent slit 30) is used as a mask in the exposure procedure similar to that shown in FIG. 7(c) to FIG. 7(e) to expose the photoresist layer 9. The top view illustrating how the mask 26 moves in the exposure process exposing the photoresist layer is shown in FIG. 13(a) to FIG. 13(c). During the exposure process, referring to FIG. 13(a), the photoresist layer is exposed once with the mask 26 at the position corresponding to the x-y coordinate shown in FIG. 13(a). Then expose the photoresist layer twice with the mask 26 at the position x1y1 corresponding to the x-y coordinate shown in FIG. 13(b). Subsequently, expose the photoresist layer three times with the mask 26 at the position x2y2 corresponding to the x-y coordinate shown in FIG. 13(c). The description mentioned above is about the movement of the mask during exposing the photoresist layer according to another preferred embodiment of the present invention. Additionally, the cross-section illustrating the relating position of the mask 26 and the photoresist layer as well as the substrate is shown in FIG. 14(a) to FIG. 14(c). The photoresist layer 32 is formed on the substrate 34. Referring to FIG. 14(a), the mask 26 is at a first position when the first time exposing the photoresist layer 32, and the power of the light source is about 30 mJoule. The forgoing first position is the same as the position of the mask 26 shown in FIG. 13(a). Then use the light source having power about 60 mJoule to expose the photoresist layer 32. Referring to FIG. 14(b), the mask 26 is at a second position when the second time exposing the photoresist layer 32. The forgoing second position is the same as the position of the mask 26 shown in FIG. 13(b), and is a position shifting a predetermined distance in both x-axis and y-axis from the first position. Subsequently, use the light source having power about 70 mJoule to expose the photoresist layer 32. Referring to FIG. 14(c), the mask 26 is at a third position when the third time exposing the photoresist layer 32. The forgoing third position is the same as the position of the mask 26 shown in FIG. 13(c), and is a position shifting a predetermined distance in both x-axis and y-axis from the second position.

Figure 15:
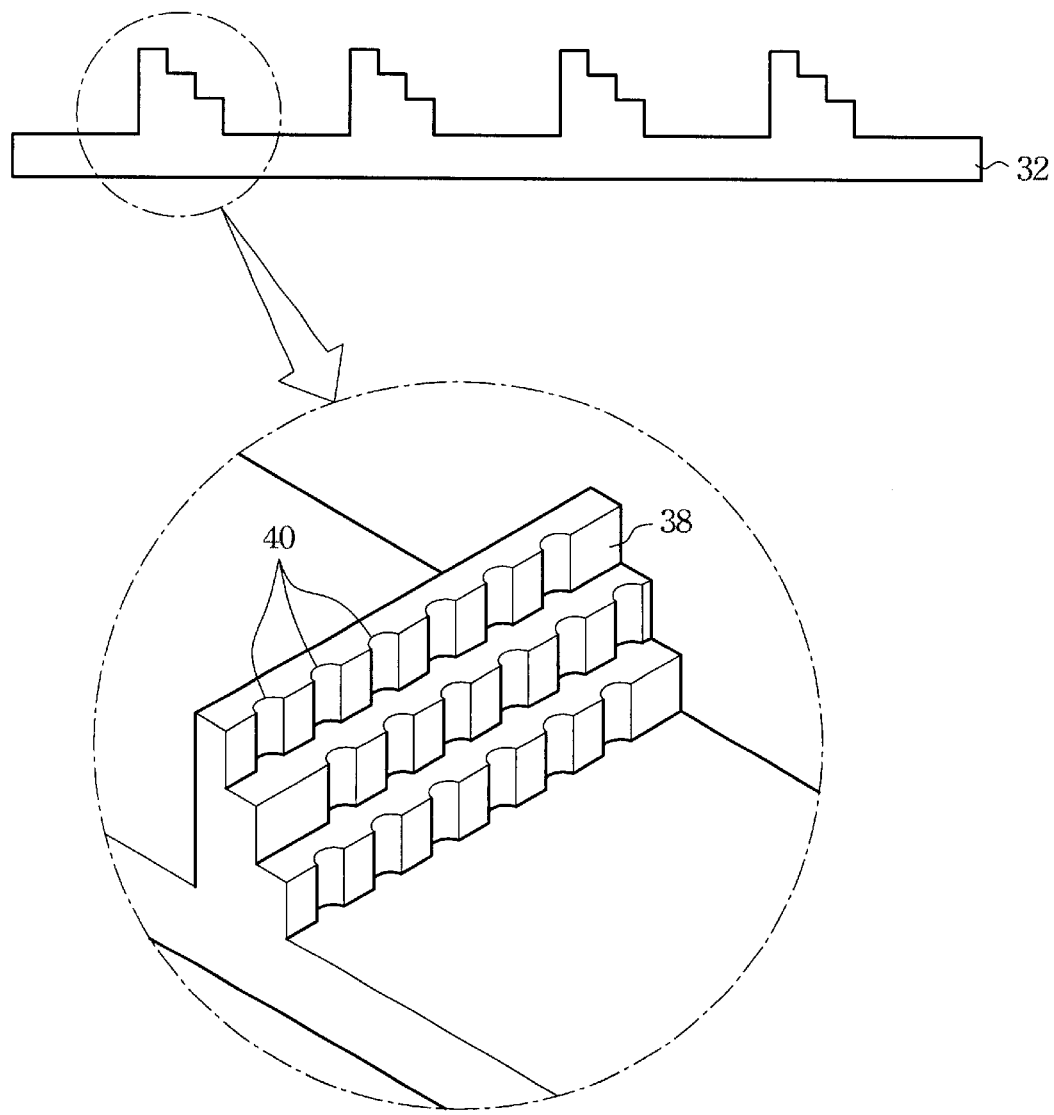
FIG. 15 illustrate the cross section of the resulted structure of the photoresist pattern and the amplified view of the stair structure having processed by the method according to another preferred embodiment of the present invention.
Figure 16:
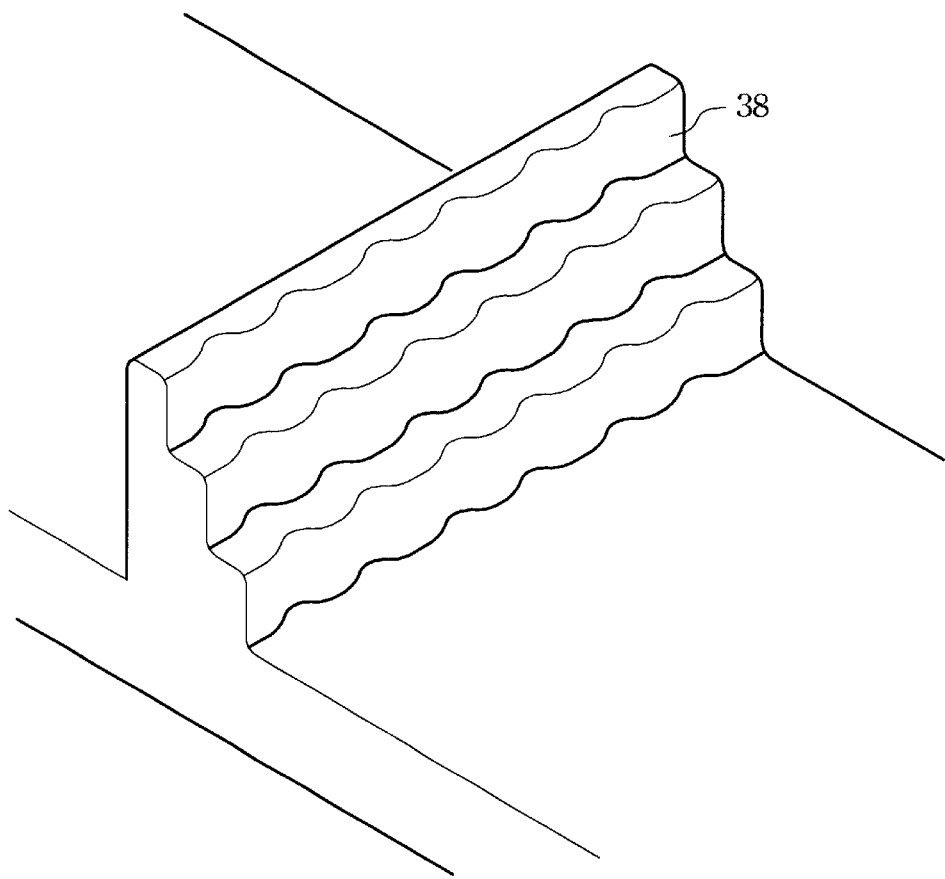
FIG. 16 illustrate the amplified view of the stair structure shown in FIG. 15 proceeded with a baking process.
Figure 17:
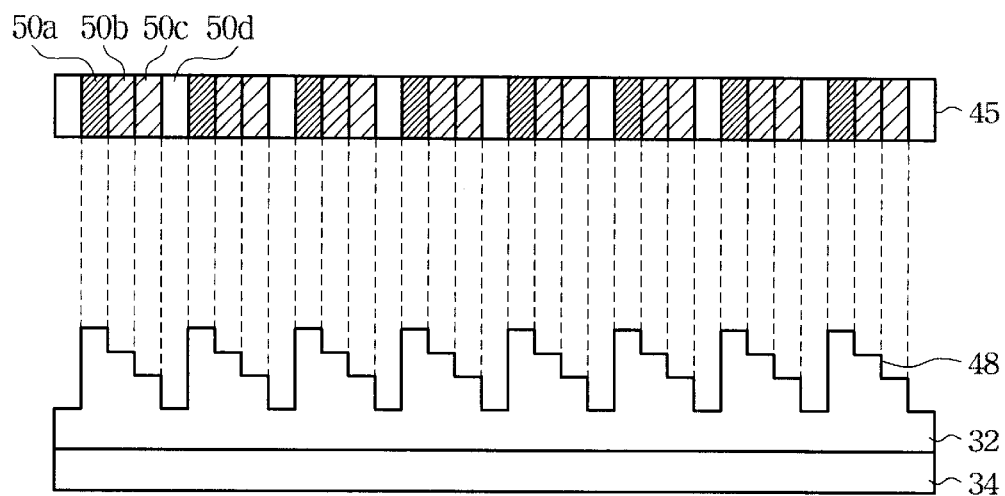
FIG. 17 illustrate that the other type of mask is utilized in an exposure process for fabricating the stair structure according to another preferred embodiment of the present invention.

After the exposing process has been finished, a development process is used, and the photoresist pattern is formed as a stair structure 38 in the photoresist layer 32 as shown in FIG. 15. The stair structure 38 can be connected one by one or separately positioned as shown in FIG. 15. Turning to FIG. 12, the set of transparent splits 30 includes the rectangular portion 30a and the protruding portion 30b, which results in the slot 40 of the stair structure 38. Then bake the photoresist layer 32, and the resulted stair structure 38 is shown in FIG. 16. Though multi-exposure shift method mentioned above can be used to manufacture the desired reflector stair structure 38 shown in FIG. 15, the other method which utilizing one step exposure can be used to manufacture the same structure. The other method uses the gray level mask 45 shown in FIG. 17 to expose the photoresist layer 32 in one exposing step. Due to the areas of various transparence, the exposed photoresist layer 32 is exposed to the light of various power, so the stair structure 48 is obtained after exposure and development process. The difference between the stair structure 48 shown in FIG. 17 and the stair structure 38 shown in FIG. 15 is the shape of the slot 40 in FIG. 15. The slot 40 in FIG. 15 is round, whereas the shape of the slot can be changed depending on the shape of the partial-transparent areas 50a, 50b, 50c, and 50d shown in FIG. 17. The transparence of the partial-transparent areas arranged from low to high is in the order 50a, 50b, 50c, and 50d. Then bake the developed photoresist layer 32 to smooth the edge of the stair structure 48. The cross-section of the baked stair structure 48 is shown in FIG. 3, whereas the oblique drawing is shown in FIG. 16. The following process is to form a reflective material on the baked photoresist layer 32 and stair structure 48 to form the reflector.

Figure 18:
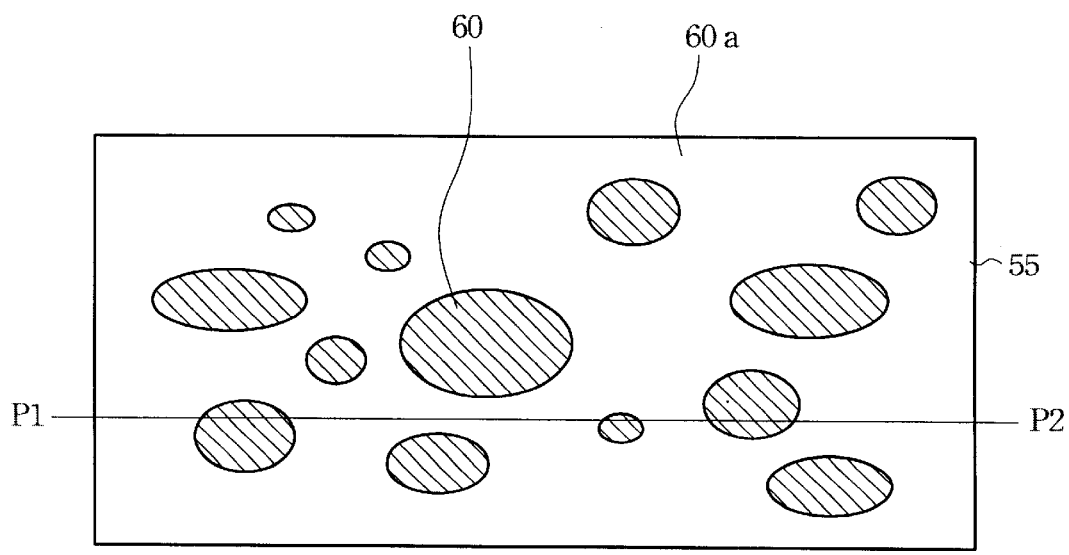
FIG. 18 illustrate the top view of the mask utilized in the multi-exposure shift method fabricating the other type of the reflector shown in FIG. 4.
Figure 19A:
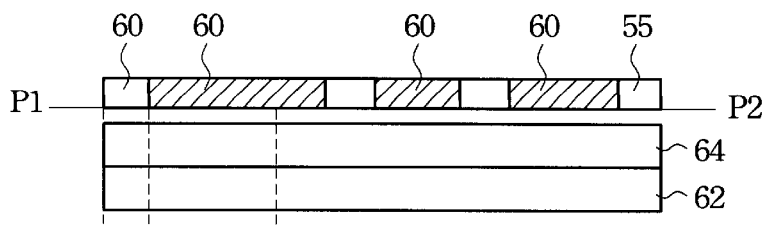
FIGS. 19(a)–(c) illustrate the cross section and the relative position of the mask and the photoresist layer during fabricating the other type of the reflector shown in FIG. 4.
Figure 19B:
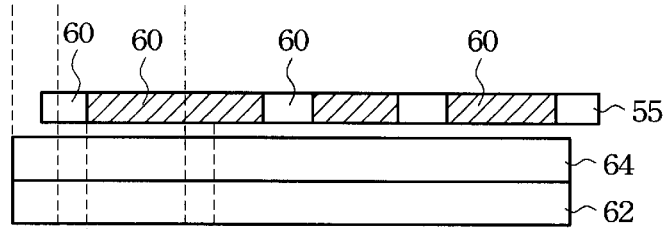
Figure 19C:
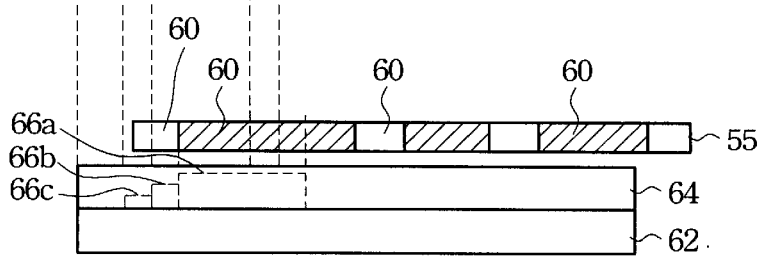
Figure 20A:
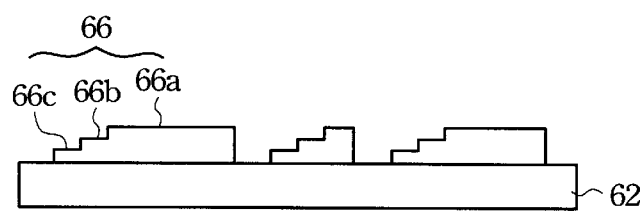
FIG. 20(a) is a cross sectional view of the resulted photoresist pattern process by the method shown in FIGS. 19(a)–19(c) having processed by a development process.
Figure 20B:
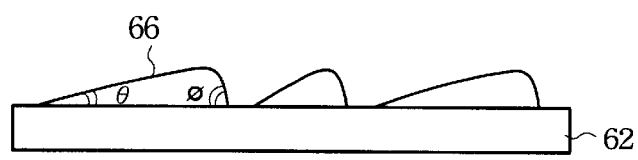
FIG. 20(b) is a cross sectional view of the resulted photoresist pattern (pump) process by a baking process.
Figure 21:
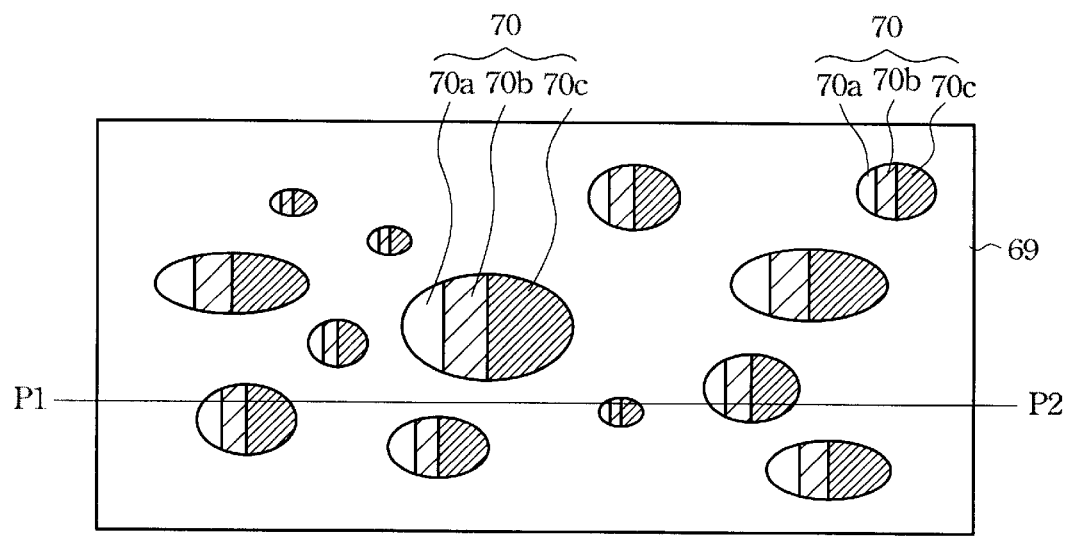
FIG. 21 illustrate the top view of the mask utilized in one exposure method fabricating the other type of the reflector shown in FIG. 4.
Figure 22A:
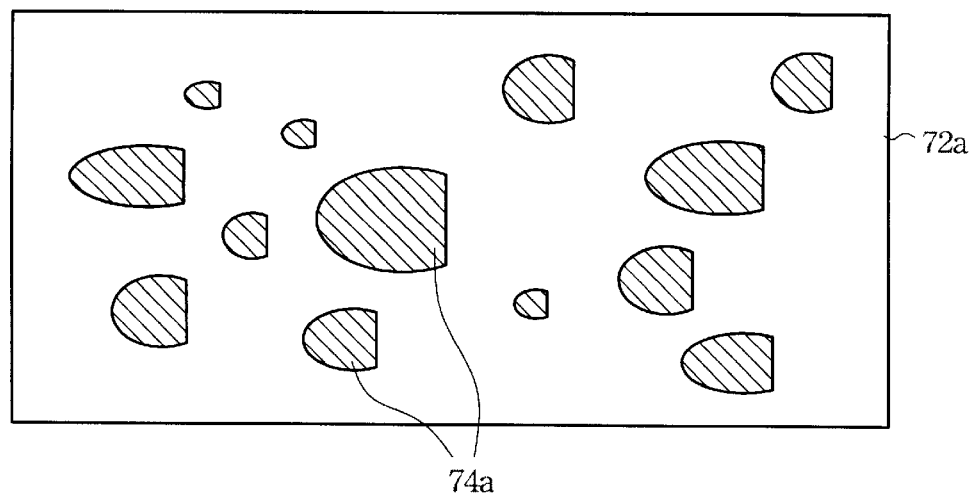
FIGS. 22(a)–(c) illustrate the top view of the mask utilized in the multi-exposure method fabricating the other type of the reflector shown in FIG. 4.
Figure 22B:
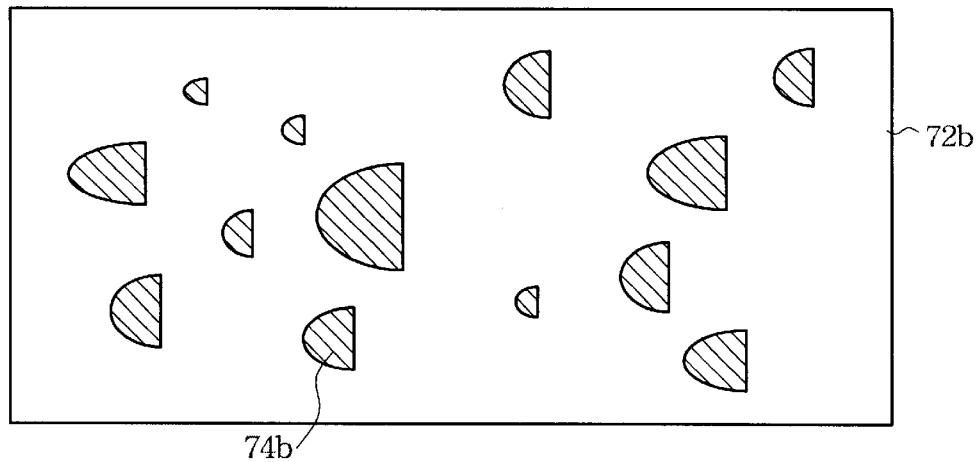
Figure 22C:
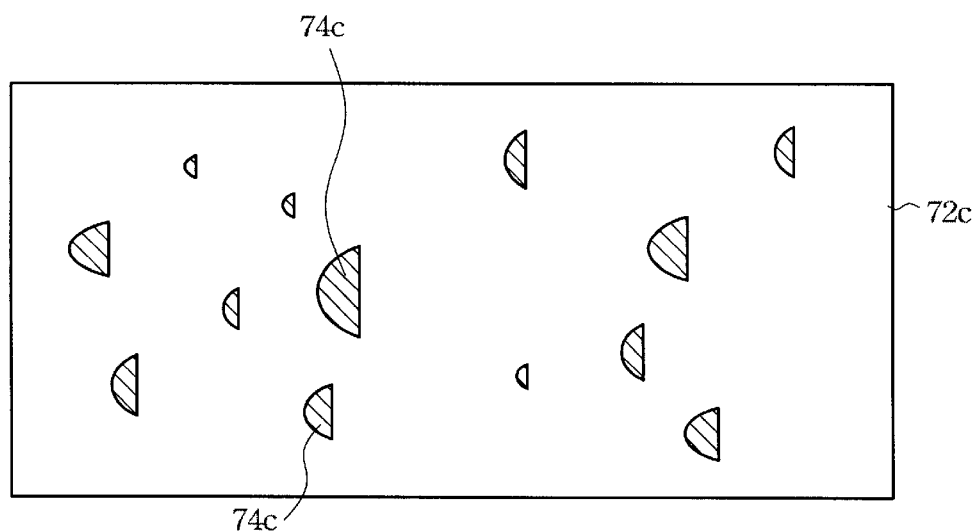
Figure 23A:
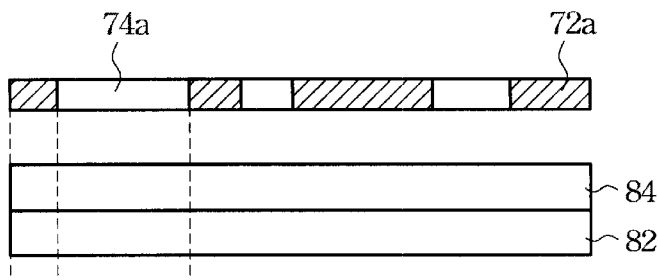
FIGS. 23(a)–(c) illustrate the cross section of the mask and the photoresist layer utilized in the multi-exposure method fabricating the other type of the reflector shown in FIG. 4
Figure 23B:
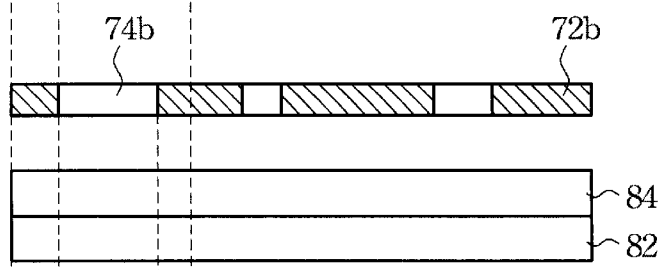
Figure 23C:
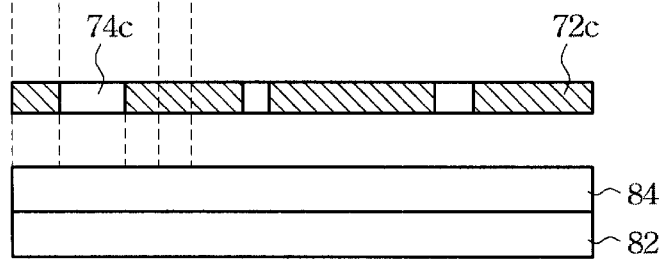
Figure 24A:
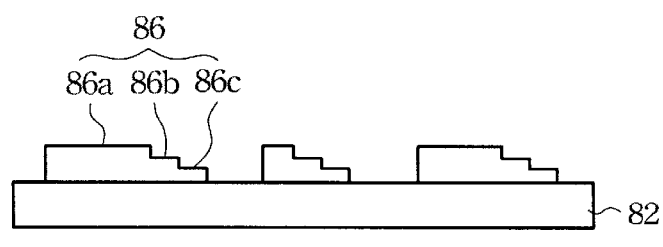
FIG. 24(a) is a cross sectional view of the resulted photoresist pattern process by the method shown in FIGS. 23(a)–23(c) having processed by a development process.
Figure 24B:
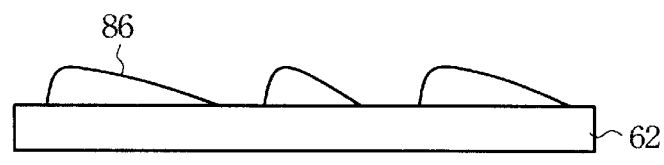
FIG. 24(b) is a cross sectional view of the resulted photoresist pattern (pump) process by a baking process.

In the various preferred embodiment of the present invention, the structure of the desired reflector is like the structure shown in FIG. 4, and the method is described below. The present invention can manufacture the bump-reflector that can reflect the incident light into the predetermined desired solid angle. Refer to FIG. 18, the mask 55 including a plurality of transparent areas 60 is used within the multi-exposure shift method shown in FIG. 7(a) to FIG. 7(e). To illustrate the method that is used to form the reflector of the structure shown in FIG. 4, use the steps shown in FIG. 19(a) to FIG. 19(c) to describe the method according to the present invention. As shown in FIG. 19(a), on the substrate 62, a photoresist layer 64 is formed, and the mask 55 having transparent area 60 is used as a mask in exposing the photoresist layer 64. Then according to the present invention, expose the photoresist layer 64 to the light source with the coverage of mask 55 for predetermined time pursuant to one's need. Subsequently, shift the mask 55 by a predetermined pitch and expose again, as shown in FIG. 19(a),(b), and(c). In FIG. 19(a), the photoresist layer 64 is exposed to the light having a power of 30 mJoul for a first predetermined period, then forward the mask 55 for a predetermined pitch. Referring to FIG. 7(b), the photoresist layer 64 is again exposed to the light having a power of 60 mJoul for a second predetermined period, subsequently forward the mask 55 for a predetermined pitch. As shown in FIG. 7(c), the photoresist layer 64 is exposed to the light having a power of 70 mJoul for a predetermined period. Repeat such procedure several times as one needs followed by developing the photoresist layer 64. Because the photoresist layer 64 can be formed of positive photoresist, so when the mask 55 is used in the exposure process, the areas on the photoresist layer 64 under the shadow of the transparent areas 60 will become convex portions after development. After the multi-exposure shift method mentioned above and the development process, the resulted photoresist pattern is shown as bump 66 including portions 66a, 66b, and 66c of various altitude. The portions of various altitudes shown in FIG. 19(c) are formed due to the various exposure power of the light sources used in the multi-exposure shift method. The portions 66a, 66b, and 66c of the photoresist layer 64 are resulted from the light sources of various power. So the bumps 66(a)–66(c) shown in FIG. 20(a) is obtained after development process, then bake the bumps 66(a)–66(c) to smooth the edge, and the resulted structure is shown as the baked bump 66 shown in FIG. 20(b). The cross-section of the bump 66 shown in FIG. 20(b) is taken in the direction as the mask 55 moves, i.e., the direction of line X1X2. According to the preferred embodiments of the present invention, the contact angle θ and φ of the surface of the bump 66 and the substrate 62 are different. Thus the reflected light can be uniformly reflected and diffused in the expected solid angle. The following process is to form a reflective layer on the photoresist layer to form the reflector according to the present invention. It is noted that although the cross-section of the bump 66 shown in FIG. 20(b) can be fabricated by the forgoing Multi-Exposure Shift Method, yet other methods can be used to fabricate the structure shown in FIG. 20(b) without departing from the present invention. In addition, the distribution of the bump 66 depends on the location of the transparent areas 60 on the mask 55 (FIG. 18). When the area of the transparent areas 60 are all the same, and the transparent areas 60 is uniform distributed, the resulted reflector will be the same as the reflector 5 shown in FIG. 4. In the other method that used to form the bump according to the present invention, one step exposure process can be used to fabricate the bump, and the gray level mask is utilized in the one step exposure process. Thus the regions of various gray level can exhibit different transparence that enabling different extents of exposure of the photoresist layer. Thus the photoresist pattern of various altitude is fabricated. The gray level mask used in the one step exposure process is shown in FIG. 21, the gray level mask 69 includes a plurality of transparent areas 70 which includes a first partial transparent area 70a, a second partial transparent area 70b, and a partial transparent area 70c. After the photoresist layer 64 (FIG. 19(a)) has been exposed using the gray level mask 69 as a mask, and then has been developed. Because the transparence of the first partial transparent area 70a is smaller than that of the second partial transparent area 70b, and the transparence of the second partial transparent area 70b is smaller than that of the third partial transparent area 70c. The profile of the resulted photoresist layer is like that shown in FIG. 20(a), and the profile of the photoresist pattern after baking process is shown in FIG. 20(b). So the bump 66 can also be obtained by the other method described above. The line P1P2 in FIG. 21 is the same as that of FIG. 19 (a), and is used to illustrate the corresponding position of the bumps in the photoresist pattern. There is still another method used to fabricate the bump according to the present invention, a plurality of masks and light source of various power are used in the forgoing method. Referring to FIG. 22(a) the mask 72a including a plurality of transparent areas 74a is used in a first exposing process, which is used to expose the photoresist layer 84 on the substrate 82 utilizing the light source having power of about 30 mJoule. Subsequently, referring to FIG. 22(b), utilize the mask 72b having a plurality of transparent areas 74b in a second exposing process. The second exposing process utilizes the light source having power of about 60 mJoule to expose the photoresist layer 84 on the substrate 82. Then refer to FIG. 22(c), utilize the mask 72c including a plurality of transparent areas 74c used in a first exposing process to expose the photoresist layer 84 on the substrate 82. During the third exposing process, the light used to expose the photoresist layer is emitted from the light source having power of about 70 mjoule. As shown in FIG. 23(a) to FIG. 23(c), because the area of the first partial transparent area 74a of the first mask 72a is greater than the second partial transparent area 74b of the second mask 72b, and the area of the second partial transparent area 74b of the second mask 72b is greater than the third partial transparent area 74c of the third mask 72c. In addition, the corresponding position of the mask 72a, 72b, and 72c to the exposed photoresist layer is all the same, besides, mask of various partial transparent area is used combined with the light source of various power. So the photoresist layer exposed according to the present invention will has the profile as bump 86 shown in FIG. 24(a) after development process. Particularly the bump according to the present invention includes the following portions: the first portion 86a, the second portion 86b, and the third portion 86c. Because the first portion 86a is exposed using the third mask 72c, the second portion 86b is exposed using the second mask 72b, and the third portion 86c is exposed using the first mask 72a. Besides, the every mask is used combined with various light sources having various power. So the topography of the resulted photoresist layer is fabricated after development process. Then bake the acquired photoresist pattern to smooth all the edges of the bump, so the cross-section of the bump 86 is smoothed as shown in FIG. 24(b). Then form a reflective material on the bump 86 to fabricate the reflector according to the present invention. Though the bump 86 is protrusive, yet the present invention is not confined to the protrusive type mentioned above, the bump 86 can be of a concave type as long as change the transparent portion and the opaque portion of the mask 72a. Nevertheless, the concave one can do the same job too as long as the angles and concavity are properly shaped.

Figure 25:
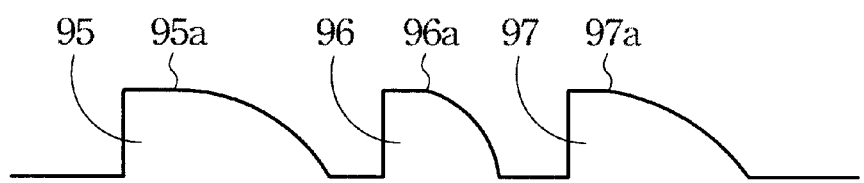
FIG. 25 illustrate the cross section of the possible size of the pumps fabricated by the process shown in FIGS. 23(a)–23(c) according to the present invention.
Figure 26:
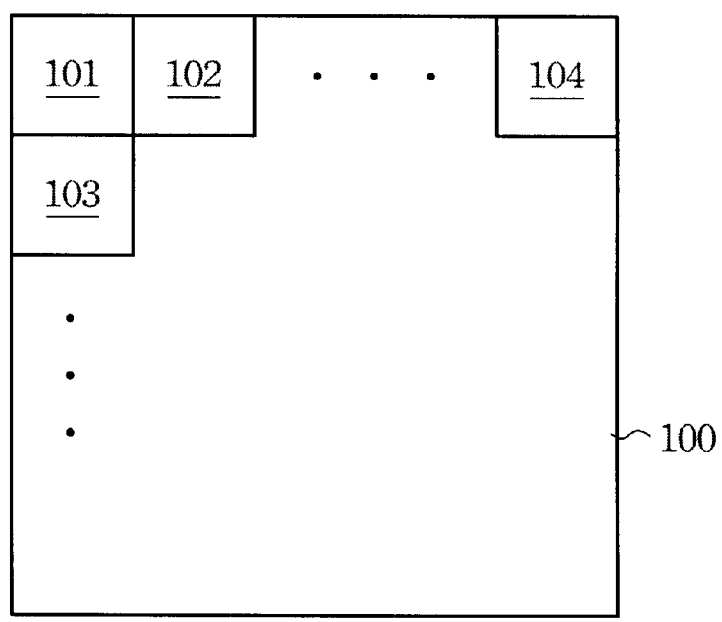
FIG. 26 illustrate the possible distribution of the resulted pumps fabricated by the method according to the present invention.

The embodiments of diffusive reflectors illustrated in the present invention should be understood as exemplary ones only, as the size and the curved pattern of a reflective element may vary in order to fit different practical uses. For example, as shown in FIG. 25, the protrusive surfaces 95a, 96a, and 97a of the reflector 95, 96, and 97 are not the same. The crucial point of the present invention is to generate a suitably curved surface on a piece of reflecting material so that the incident light will be reflected and, owing to the curvature on the reflecting surface, diffused to a preferred solid angle. In addition, the distribution of the bump within various regions of the photoresist layer can be different, besides the shape of the bump within various regions of the photoresist layer can also be different. For example, the profile of the bump within the region 101 of photoresist layer 100 can be all the same, whereas the profile of the bump within the region 101 can be different from that of the region 102, 103 or 104.

Therefore, all other similar structures and even the ones that can diffuse reflected light into the desired solid angle by use of the special reflecting property of nonplanar reflecting surfaces, whether they are similar to the ones disclosed in the instant specification or not, of regular or irregular pattern, should be construed as falling into the purview of the present invention.

Consequently, all other masks with similar patterns or even the very different ones that can, nonetheless, be used to manufacture the required reflectors should be construed as part of the present invention.

Figure 27:
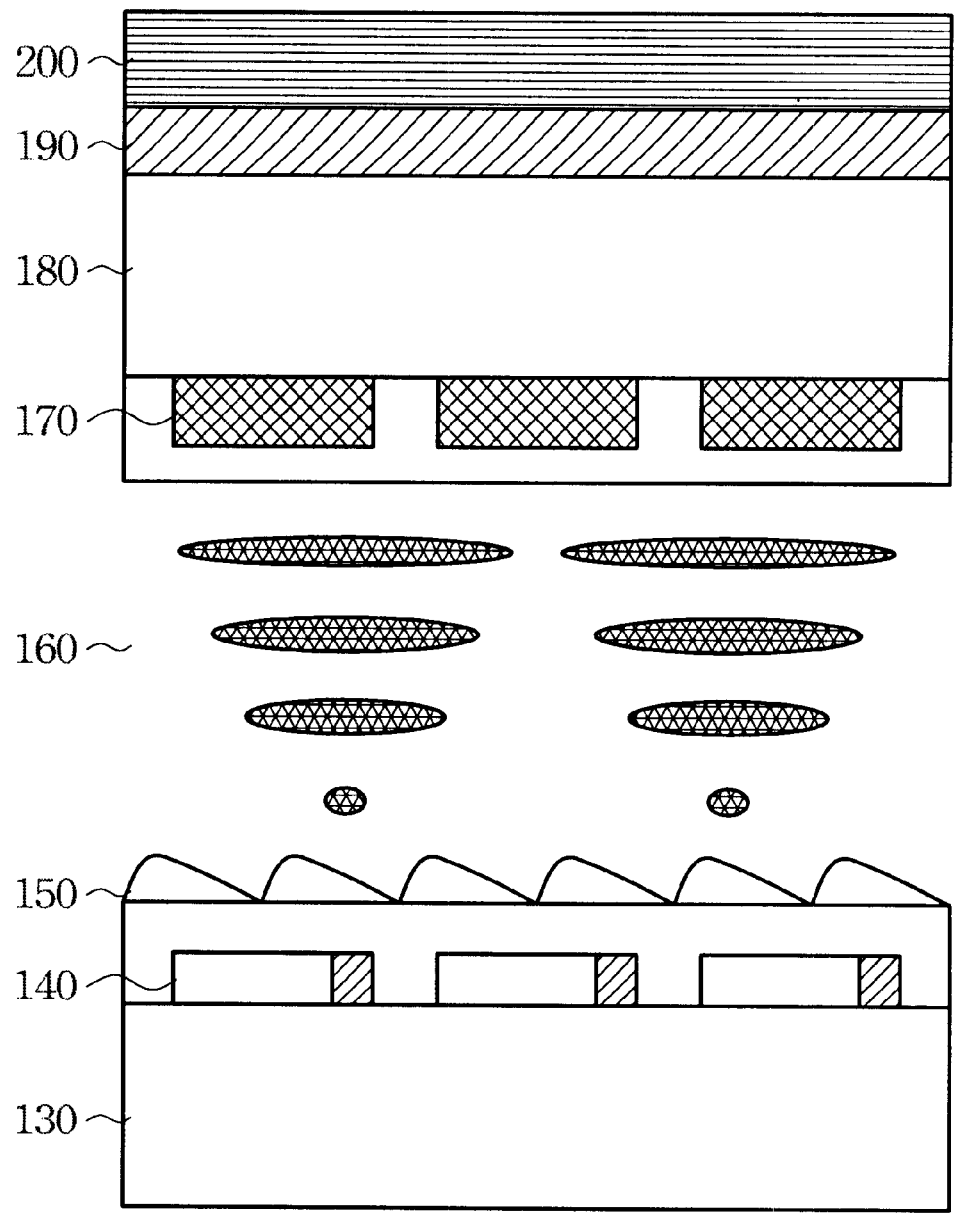
FIG. 27 illustrate the cross section of a TFT LCD using the reflective type light diffuser (reflector) fabricated by the method proposed by the present invention.

When reflectors according to the present invention are obtained, one can use them as the reflective bases in reflection-type LCDs. An embodiment of a reflection-type TFT-LCD incorporating the technology disclosed herein is demonstrated in the structural cross-section view FIG. 27. An active matrix 140 is deployed on a substrate 13. A curved surface reflector 150 according to the present invention is then attached onto said active matrix 140 with the same material used as the substrate of the reflector 150 filled in the vacant space. A color filter 170 covers the reflector 150 with LC mode 160 mediated in between. A combined layers of a polarizer 200, a $\lambda/4$ film 190, and glass 180 are then connected onto the top surface of the color filter 170.

The distinctive feature of the instant invention is that no diffusive material is included for the purpose of diffusing incident light. This goal is simply achieved by the utilization of curved surfaces on the reflective elements. Therefore, no issues such as color dispersion, reflective efficiency, and resolution power need to be worried. The reflector in the specification of the present invention is the reflection-type diffuser used in the LCD. Since such curved surfaces of the reflector according to the present invention are properly tuned, they also possess the ability to scatter incident light to a specific solid angle demanded by the practical application. Thus, these advantages, when applied to reflection-type TFT-LCDs in place of traditional methods, greatly lower the cost of manufacture and enhance the performance of the product.

What is claimed is:

1. A method for fabricating reflection-type light diffuser, said reflection-type light diffuser being used for scattering incident light into a predetermined angular area away from specular ray, said method comprising:

forming a photoresist layer on a substrate;

using a first mask in a multi-exposure shift process to expose said photoresist layer, said multi-exposure shift process comprising:

using a first light source having a first power to expose said photoresist layer with said first mask positioned at a first position;

shifting said first mask by a pitch to a second position; and using a second light source having a second power to expose said photoresist layer with said first mask positioned at a second position, said first power being unequal to said second power;

exposing said photoresist layer by using a second mask;
developing said photoresist layer to form a photoresist pattern, said photoresist pattern comprising a plurality of knob-on-slant structures parallel to each other, each of said plurality of knob-on-slant structures comprising a slant portion and a knob portion, said slant portion being resulted from said multi-exposure shift process using said first mask, said knob portion formed on said slant portion being resulted from said exposing step using said second mask, said slant portion comprising a first surface and a second surface, said first surface having a longer slant than said second surface, a first angle between said first surface and said substrate being unequal to a second angle between said second surface and said substrate; and
forming a reflective layer on said photoresist pattern, a normal direction of said first surface being pointing to a predetermined direction enabling reflective light of said incident light reflected by said reflective layer scattered into said predetermined angular area.

2. The method as claim 1 further comprising a baking process after said developing process, said baking process being used to smooth edges of said photoresist pattern.

3. The method as claim 1, wherein a curve of said first surface in an incident plane including said incident light is monotonically convex.

4. The method as claim 1, wherein the curve of said first surface in the incident plane including said incident light is monotonically concave.

5. The method as claim 1, wherein each of said plurality of knob-on-slant structures having straight edges resulting form straight slits of said first mask.

6. The method as claim 1, wherein each of said plurality of knob-on-slant structures having curved edges resulting form curve slits of said first mask.

7. A method for fabricating reflection-type light diffuser, said reflection-type light diffuser being used for scattering incident light into a predetermined angular area away from specular ray, said method comprising:
forming a photoresist layer on a substrate;
using an exposing step to expose said photoresist layer;
developing said exposed photoresist layer to form a photoresist pattern, said photoresist pattern comprising a plurality of stair structures parallel to each other, each of said plurality of stair structures comprising a first stair and a second stair, altitude of said first stair being higher than altitude of said second stair, said first stair being adjacent to said second stair; and
forming a reflective layer on said photoresist pattern, a normal direction of said first surface being pointing to a predetermined direction enabling reflective light of said incident light reflected by said reflective layer scattered into said predetermined angular area.

8. The method as claim 7 further comprising a baking process after said developing process, said baking process being used to smooth edges of said photoresist pattern.

9. The method as claim 7, wherein said exposing step being a multi-exposure shift process, said multi-exposure shift process comprising:
using a first light source having a first power to expose said photoresist layer with a mask, said mask comprising a plurality of transparent slits, each of said plurality of transparent slits comprising a straight portion and a round arch portion;
shifting said mask by a pitch in both first direction and second direction, said first direction being parallel to said straight portion, said second direction being perpendicular to said first direction; and
using a second light source having a second power to expose said photoresist layer with said mask, said first power being unequal to said second power; and
shifting said mask by said pitch in both said first direction and said second direction.

10. The method as claim 7, wherein said exposing step utilizes a light source to expose said photoresist layer under coverage of a mask, said mask comprising a first partial transparent area and a second partial transparent area, diaphaneity of said first partial transparent area being different from that of said second partial transparent area, said first stair of said stair structure being resulted from said exposure through said first partial transparent area.

11. A method for fabricating reflection-type light diffuser, said reflection-type light diffuser being used for scattering incident light into a predetermined angular area away from specular ray, said method comprising:
forming a photoresist layer on a substrate;
using an exposing step to expose said photoresist layer;
developing said photoresist layer to form a photoresist pattern, said photoresist pattern comprising a plurality of pumps, each of said pumps comprising a first flat portion and a second flat portion, altitude of said first flat portion being higher than altitude of said second flat portion, said first flat portion being adjacent to said second flat portion;
baking said developed photoresist pattern, edges of each of said pumps of said photoresist pattern being smoothed, each of said baked pumps comprising a first surface and a second surface, said first surface being longer than said second surface, a first angle between said first surface and said substrate being unequal to a second angle between said second surface and said substrate, said pumps being randomly distributed on said substrate; and
forming a reflective layer on said photoresist pattern, a normal direction of said first surface being pointing to a predetermined direction enabling reflective light of said incident light reflected by said reflective layer scattered into said predetermined angular area.

12. The method as claim 11, wherein said exposing step being a multi-exposure shift process comprising:
using a first light source having a first power to expose said photoresist layer with a mask, said mask comprising a plurality of transparent regions;
shifting said mask by a pitch; and
using a second light source having a second power to expose said photoresist layer with said mask, said first power being unequal to said second power, said first flat portion of every of said pump being formed by exposing to said first light source, said second flat portion of every of said pump being formed by exposing to said second light source, said mask comprising a plurality of transparent regions that is distributed randomly, random distribution of said pumps being resulted from that of said transparent regions on said mask.

13. The method as claim 11, wherein said exposing step utilizes a light source to expose said photoresist layer in one exposing step under coverage of a mask, said mask comprising a plurality of transparent regions, each of said transparent regions comprising a first partial transparent area and a second partial transparent area, diaphaneity of said first partial transparent area being different from that of said second partial transparent area, said first flat portion of every of said pumps being formed by exposing said photoresist pattern to said light source through said first partial transparent area, said second flat portion of every of said pumps being formed by exposing to said light source through said second partial transparent area, random distribution of said pumps being resulted from the random distribution of said transparent regions on said mask.

14. The method as claim 11, wherein said exposing step being a multi-exposure process comprising:

using a first light source having a first power to expose said photoresist layer with a first mask at a position relative to said photoresist layer, said first mask comprising a first set of transparent regions; and using a second light source having a second power to expose said photoresist layer with a second mask at said position relative to said photoresist layer, said second mask comprising a second set of transparent regions, area of said first set of transparent regions being greater than said second set of transparent regions, location of every of said first set of transparent regions being overlapped with said second set of transparent regions, said first power being unequal to said second power, said first flat portion of every of said pumps being formed by exposing to said first light source through said first mask, said second flat portion of every of said pump being formed by exposing to said second light source through said second mask.

* * * * *